United States Patent
Ju

(10) Patent No.: US 11,491,649 B2
(45) Date of Patent: Nov. 8, 2022

(54) AXIS-INVARIANT BASED MULTI-AXIS ROBOT KINEMATICS MODELING METHOD

(71) Applicant: Hehua Ju, Nanjing (CN)

(72) Inventor: Hehua Ju, Nanjing (CN)

( * ) Notice: Subject to any disclaimer, the term of this patent is extended or adjusted under 35 U.S.C. 154(b) by 492 days.

(21) Appl. No.: 16/541,125

(22) Filed: Aug. 14, 2019

(65) Prior Publication Data

US 2020/0055184 A1    Feb. 20, 2020

(30) Foreign Application Priority Data

Aug. 16, 2018 (CN) .......................... 201810933374.7

(51) Int. Cl.
*B25J 9/16* (2006.01)
*G05B 17/02* (2006.01)
*G06F 111/10* (2020.01)

(52) U.S. Cl.
CPC ........... *B25J 9/1605* (2013.01); *B25J 9/1607* (2013.01); *B25J 9/1671* (2013.01); *G05B 17/02* (2013.01); *G05B 2219/50391* (2013.01); *G06F 2111/10* (2020.01)

(58) Field of Classification Search
CPC ...... B25J 9/1605; B25J 9/1607; B25J 9/1671; G06F 2217/16; G05B 2219/50391; G05B 17/02
USPC .................. 700/245, 253, 250; 901/1, 30
See application file for complete search history.

(56) References Cited

U.S. PATENT DOCUMENTS

| | | | |
|---|---|---|---|
| 5,390,288 A | 2/1995 | Toda et al. | |
| 6,266,578 B1 * | 7/2001 | Udwadia | B25J 9/1633 700/250 |
| 6,278,906 B1 * | 8/2001 | Piepmeier | B25J 9/1607 700/59 |
| 6,865,446 B2 * | 3/2005 | Yokono | B25J 9/1633 700/257 |

(Continued)

FOREIGN PATENT DOCUMENTS

| | | |
|---|---|---|
| CN | 101733749 A | 6/2010 |
| CN | 101733749 A | 6/2010 |
| CN | 104573255 A | 4/2015 |

(Continued)

OTHER PUBLICATIONS

1 Search Report of the related PCT application See below CN104573255A CN101733749A CN105519268B CN108227492A CN107901037A JP2004230530A JP2004272783A.

*Primary Examiner* — Dalena Tran
(74) *Attorney, Agent, or Firm* — Bayramoglu Law Offices LLC

(57) ABSTRACT

The invention proposes an axis-invariant multi-axis system dynamics modeling and solving principle, and realizes iterative explicit dynamic modeling of multi-axis systems with tree chains, closed chains, friction and viscous joints and moving pedestals. The established model has elegant chain symbol system with pseudo-code function, which realizes complete parameterization including "topology, coordinate system, polarity, structural parameters, mass inertia, etc.". The principle can be set to circuit, code, directly or indirectly, partially or fully executed inside a multi-axis robot system. In addition, the present invention also includes analytical verification system constructed on these principles for designing and verifying a multi-axis robot system.

22 Claims, 57 Drawing Sheets

60111 — base
60211 — the first link and revolute joint pair $^0R_1$
60311 — the second link and revolute joint pair $^1R_2$
60411 — the third link and revolute joint pair $^2R_3$
60511 — the first gripper and revolute joint pair $^3R_4$
60611 — the second gripper and revolute joint pair $^4R_5$
60711 — the third gripper and revolute joint pair $^5R_6$

(56) References Cited

U.S. PATENT DOCUMENTS 9,381,643 B2 * 7/2016 Hoffmann ............... A61B 34/30
9,463,573 B2 * 10/2016 Inazumi ................... B25J 13/08

FOREIGN PATENT DOCUMENTS

| CN | 104573255 | A | 4/2015 |
| CN | 105519268 | B | 6/2015 |
| CN | 105519268 | B | 6/2015 |
| CN | 107901037 | A | 4/2018 |
| CN | 107901037 | A | 4/2018 |
| CN | 108227492 | A | 6/2018 |
| CN | 108227492 | A | 6/2018 |
| JP | 2004230530 | A | 8/2004 |
| JP | 2004230530 | A | 8/2004 |
| JP | 2004272783 | A | 9/2004 |
| JP | 2004272783 | A | 9/2004 |

* cited by examiner

101 — link $l$
102 — link $\overline{l}$ 303 301 302

| Name | ID | Type of Joint Pairs | Drawing | Diagram | Motion-Axis | Constraint Axis | |
|---|---|---|---|---|---|---|---|
| | | | | | | Rotational Axis | Translational Axis |
| Sphere Joint | S | Space Class III lower pair | | | 3 | 0 | 3 |
| Gimbal Joint | G | Space Class IV lower pair | | | 2 | 1 | 3 |
| Cylindrical Joint | C | Space Class IV lower pair | | | 2 | 2 | 2 |
| Helical Joint | H | Space Class V lower pair | | | 1 | 2 or 3 | 1 or 2 |
| Prismatic Joint | P | Surface Class V lower pair | | | 1 | 3 | 2 |
| Revolute Joint | R | Surface Class V lower pair | | | 1 | 2 | 3 |

| Name | ID | Type of Joint Pairs | Drawing | Diagram | Motion-Axis | Constraint Axis | |
|---|---|---|---|---|---|---|---|
| | | | | | | Rotational Axis | Translational Axis |
| Contact Joint | O | Space Class I lower pair | | | 5 | 0 | 1 |
| Virtual Joint | V | | | | 6 | 0 | 0 |
| Fixed Joint | X | | | | 0 | 3 | 3 |

Fig. 4

| Name | ID | Diagram | Description |
|---|---|---|---|
| Inertial space | $i$ | ⌐⌐⌐ | [1] $i$ represents the root of tree-typed system. |
| Inertial center | $l_I$ | ⊗ or • | [2] $l_I$ indicates the inertial center $I$ belongs to Link #$l$.<br>[3] Mass centers are key points in dynamics. |
| Geometrical body | $\Omega_l$ | ⊥ | [4] $\Omega_l$ stands for the geometrical body of Link #$l$. |

Fig. 5

601 — base
602 — the first link and revolute joint pair $^0R_1$
603 — the second link and revolute joint pair $^1R_2$
604 — the third link and revolute joint pair $^2R_3$
605 — the first gripper and revolute joint pair $^3R_4$
606 — the second gripper and revolute joint pair $^4R_5$
607 — the third gripper and revolute joint pair $^5R_6$ 6011 — base
6021 — the first link and revolute joint pair $^0R_1$
6031 — the second link and revolute joint pair $^1R_2$
6041 — the third link and revolute joint pair $^2R_3$
6051 — the first gripper and revolute joint pair $^3R_4$
6061 — the second gripper and revolute joint pair $^4R_5$
6071 — the third gripper and revolute joint pair $^5R_6$ 60111 — base
60211 — the first link and revolute joint pair $^0R_1$
60311 — the second link and revolute joint pair $^1R_2$
60411 — the third link and revolute joint pair $^2R_3$
60511 — the first gripper and revolute joint pair $^3R_4$
60611 — the second gripper and revolute joint pair $^4R_5$
60711 — the third gripper and revolute joint pair $^5R_6$ 701 — right rocker
702 — left rocker
703 — differential machanism
704 — right differential machanism arm
705 — left differential machnism arm
706 — right helical gear
707 — left helical gear
708 — front helical gear
709 — back helical gear
710 — chassis
711 — chassis bottom 801 — left rocker
802 — right rocker
803 — left differential arm
804 — right differential arm
805 — the horizontal axle
806 — left bogie
807 — right bogie 901 — the prismatic joint
902 — the spherical joint
903 — link 1101 — the 1D coordinate axis $l$
1102 — the origin $O_l$
1103 — the basis vector $\mathbf{e}_l$
1104 — point $S$ 1201 — the orgin $O_l$
1202 — point $l_S$
1203 — the position vector $l\vec{r}_{l_S}$
1204 — the 1D coordinate axis $l$
1205 — the projection vector $l r_{l_S}$
1206 — the basis vector $\mathbf{e}_l$ $O_l$ — the origin
$\mathbf{e}_l$ — the basic vector
$^{\overline{l}}\vec{n}_l$ — the unit Axis-Vector
$\phi^l_{lx}$, $\phi^l_{ly}$, $\phi^l_{lz}$ — three basic component 1601 — angular position $\phi_l^{\bar{l}}$
1602 — coordinate vector $^{\bar{l}}\vec{n}_l$ 1701 — link $\bar{l}$ 1702 — link $l$ 1703 — the position vector $^{\bar{l}}_0 r_l$ 1704 — the axis-vector $^{\bar{l}} n_l$ 1801 — the nature zero position vector $_0^{\bar{l}}\vec{u}_l$ 1802 — the current unit vector $_t^{\bar{l}}\vec{u}_l$ 1803 — the axis-vector $^{\bar{l}}\vec{n}_l$ 1804 — angular position $\phi_l^{\bar{l}}$ 1805 — the origin $O_l$ 1805 — the radical axis $\phi_{\overline{l}}$ — the rotation angle to the axis $z_{\overline{l'}}$ $\alpha_{\overline{l}}$ — the rotation angle to the axis $x_{l'}$ 2001 — the first revolute joint
2002 — the second revolute joint
2003 — the third revolute joint
2004 — wrist center
2005 — axis $R_1$
2006 — axis $R_2$
2007 — axis $R_3$
2008 — pick point

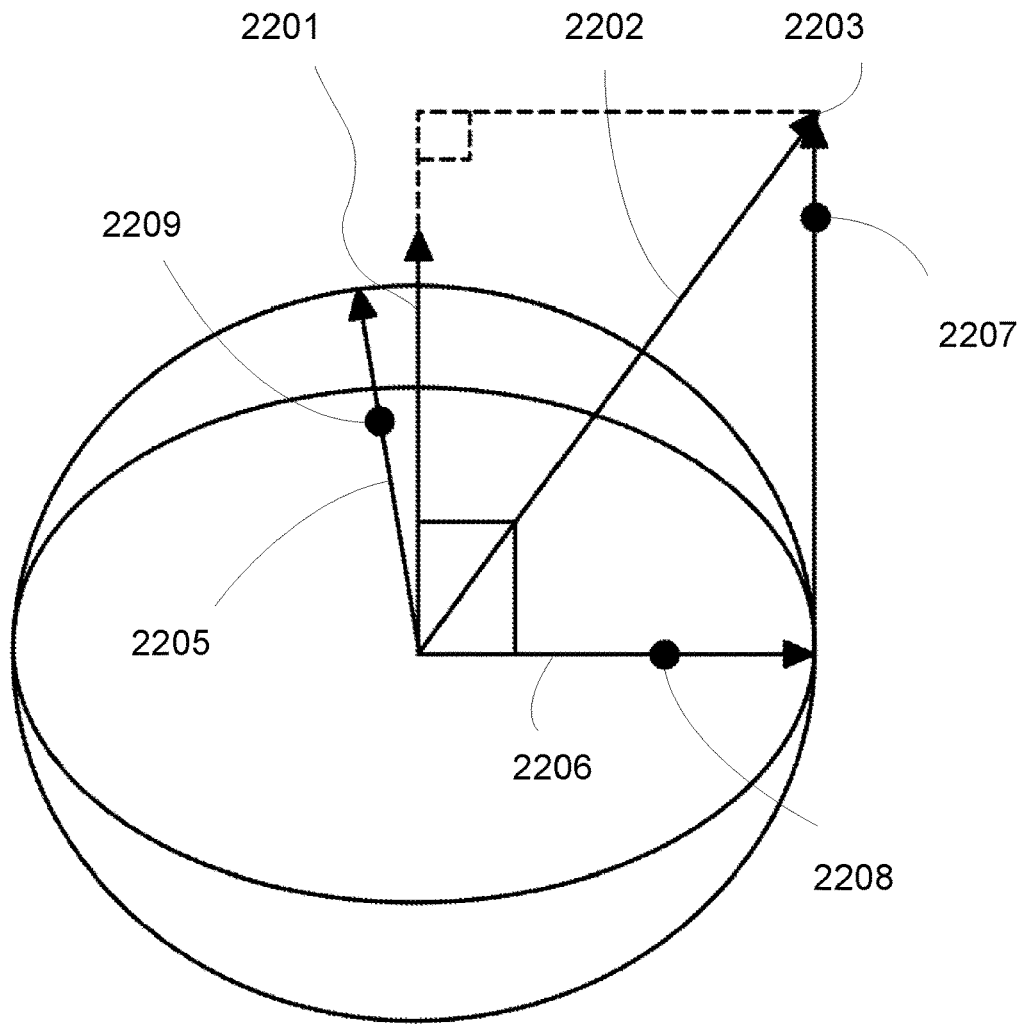

2201 — the axis-vector $^{\bar{l}}n_l$
2202 — the unit vector $_0^l u_{l_s}$
2203 — a point $S$ located on the unit sphere
2205 — radial axis-vector $^{\bar{l}}_o n_l$ at initial time
2206 — nature zero-point axis-vector $^{\bar{l}}_. n_l$
2207 — the projection vector of the unit vector $_0^l u_{l_s}$ to the axis vector $^{\bar{l}} n_l$ is $\left(^{\bar{l}} n_l \cdot {}^{\bar{l}} n_l^T\right) \cdot {}_0^l u_{l_s}$
2208 — the projection vector of the unit vector $_0^l u_{l_s}$ to the natural zero-position axis vector $^{\bar{l}}_x n_l$ is $\left(1 - {}^{\bar{l}} n_l \cdot {}^{\bar{l}} n_l^T\right) \cdot {}_0^l u_{l_s}$
2209 — the first-order vector screw of Axis-Vector $^{\bar{l}} n_l$ to $_0^l u_{l_s}$ is $^{\bar{l}} \tilde{n}_l \cdot {}_0^l u_{l_s}$

Fig. 22

2301 — point $S$
2302 — the image of point $S$ is point $S'$
2303 — the inverse image of point $S$ is point $S''$
2304 — the axis-vector of mirror $^{\bar{l}}n_l$
2305 — vector $^{l}r_{l_s}$
2306 — the vector from point $S$ to point $S'$ is $-2 \cdot \left( ^{\bar{l}}n_l \cdot {}^{\bar{l}}n_l^{\mathrm{T}} \right) \cdot {}^{l}r_{l_s}$

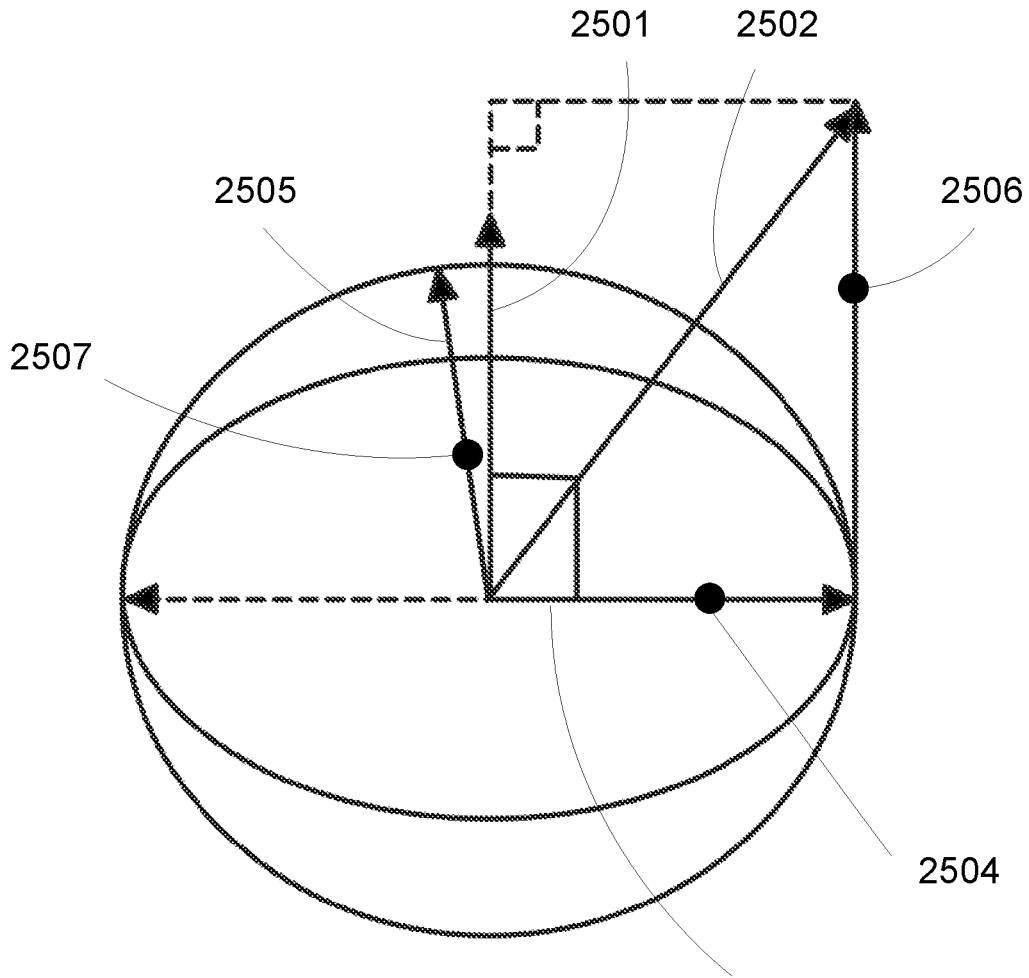

2501 — the fixed-axis vector $^{\bar{I}}n_l$
2502 — the consolidated unit vector of $^{\bar{I}}n_l$ is $^{l}u_{l_s}$
2503 — the natural zero-point vector $^{\bar{I}}\!n_l$
2504 — the projection of $^{l}u_{l_s}$ to the natural zero-point vector $^{\bar{I}}\!n_l$ is $\left(\mathbf{1} - {}^{\bar{I}}n_l \cdot {}^{\bar{I}}n_l^{\mathrm{T}}\right) \cdot {}^{l}u_{l_s} \cdot \mathrm{C}\!\left(\phi_l^{\bar{I}}\right)$
2505 — the radical axis-vector $^{\bar{I}}_{\circ}n_l$
2506 — the axial component $\left({}^{\bar{I}}n_l \cdot {}^{\bar{I}}n_l^{\mathrm{T}}\right) \cdot {}^{l}u_{l_s}$
2507 — the radical axis-vector $^{\bar{I}}\tilde{n}_l \cdot {}^{l}u_{l_s}$

Fig. 25a

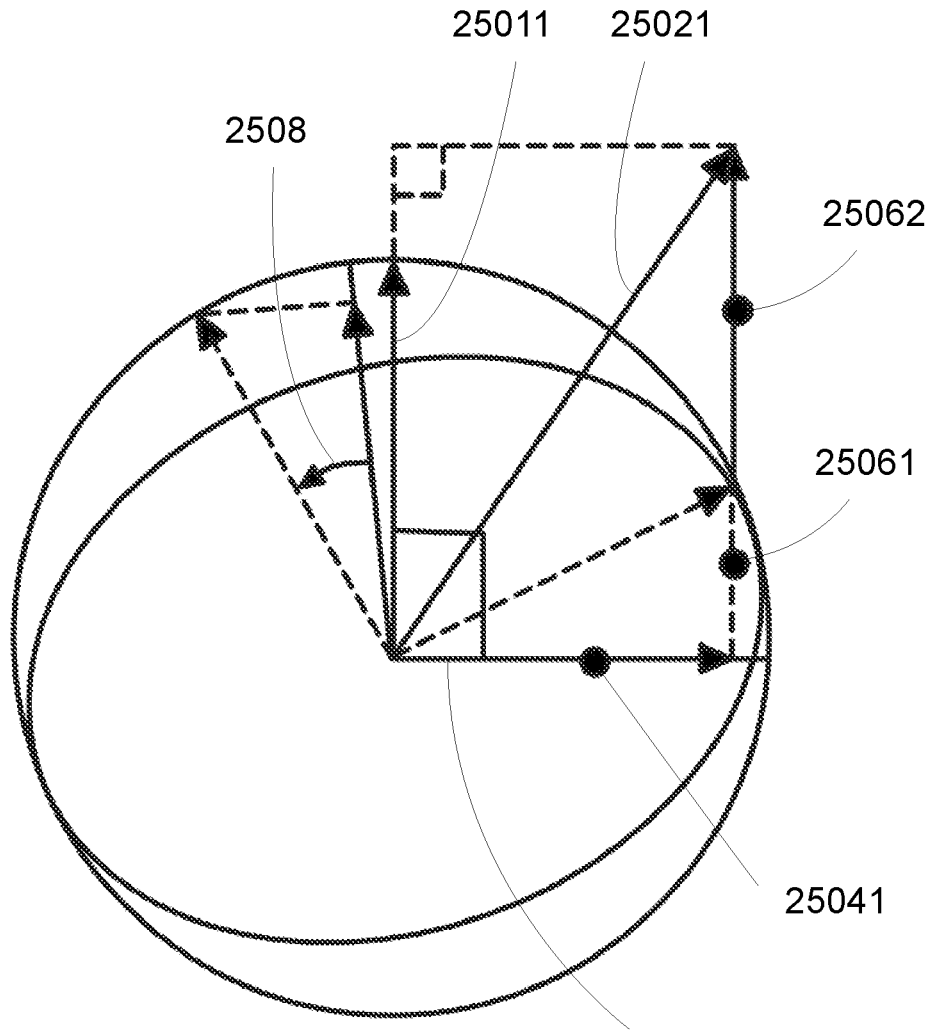

2508 — the rotational angle $\phi_l^{\bar{l}}$
25011 — the Axis-Vector $^{\bar{l}}n_l$
25021 — the unit vector $^l u_{l_s}$
25031 — the natural zero-position vector $^{\bar{l}}_{\cdot}n_l$
25041 — the projection of $^l u_{l_s}$ to the natural zero-position vector $^{\bar{l}}_{\cdot}n_l$ is $\left(1 - {}^{\bar{l}}n_l \cdot {}^{\bar{l}}n_l^{\mathrm{T}}\right) \cdot {}^l u_{l_s} \cdot \mathrm{C}\!\left(\phi_l^{\bar{l}}\right)$
25061 — the vector screw of $^l u_{l_s}$ to the natural radial Axis-vector $^{\bar{l}}_{\circ}n_l$ is $^{\bar{l}}\tilde{n}_l \cdot {}^l u_{l_s} \cdot \mathrm{S}\!\left(\phi_l^{\bar{l}}\right)$
25062 — the axial component $\left({}^{\bar{l}}n_l \cdot {}^{\bar{l}}n_l^{\mathrm{T}}\right) \cdot {}^l u_{l_s}$

Fig. 25b

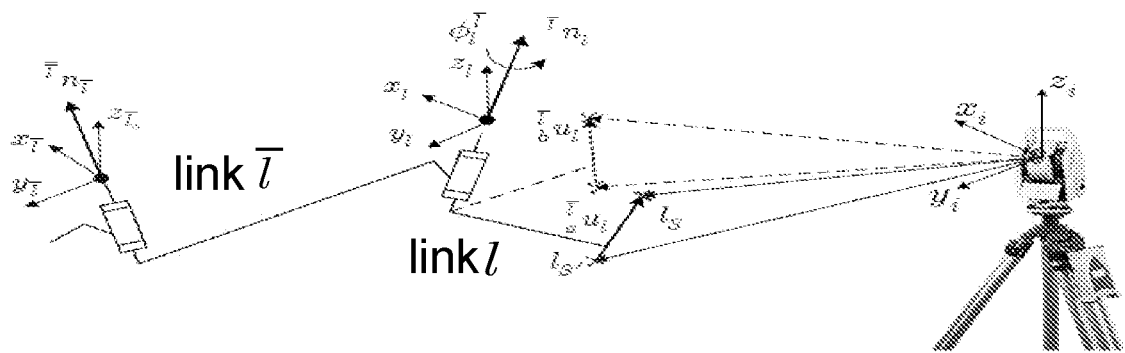

$l_S$、$l_{S'}$ — the positions of the laser tracker $_a^{\bar{l}}u_l$ — the unit position vector obtained after the rotation of axis $l$ with an angle of $_a\phi_l^{\bar{l}}$, the positions of laser track balls are $_a^i r_{l_{S'}}$ and $_a^i r_{l_S}$ $_b^{\bar{l}}u_l$ — the unit position vector obtained after the rotation of axis $l$ with an angle of $_b\phi_l^{\bar{l}}$, the positions of laser track balls are $_b^i r_{l_{S'}}$ and $_b^i r_{l_S}$

Fig. 29

$^{i|\bar{k}}\tilde{n}_k \ \ ^{i|k}r_{n_S}$ — cross product of axis-vector $^{i|\bar{k}}n_k$ and axis-vector $^{i|k}r_{n_S}$ $\overline{\overline{l}}n_{\overline{l}}$ — the axis-invariant $\overline{l}n_l$ — the axis-invariant $\overline{l}r_l$ — the position vector $^{\bar{l}}n_l$ — the axis-invariant $^{l}n_{\bar{l}}$ — the axis-invariant $^{\bar{l}}u_l$ — the screw radial invariant $O_{l'}$ — the origin of the D-H Frame $O_{\bar{l}^*}$ — the median point $^{\bar{l}}n_{\bar{l}}$, $^{\bar{l}}n_l$ — the axis-invariants $^{\bar{l}}|e_{\bar{l}'}^{[z]}$ — the equivalent to the axis-invariant $^{\bar{l}}n_{\bar{l}}$ $^{\bar{l}}|e_{l'}^{[z]}$ — the equivalent to the axis-invariant $^{\bar{l}}n_l$ $^{\bar{l}}|e_{l'}^{[x]}$ — a common perpendicular from $n_{\bar{l}}$ to $n_l$ $p$ — the rover solar wing $c$ — the rover classis $\phi_p^c$ — joint variable of axis $p$ $S_r$, $S_l$ — anterolateral and posterolateral points of the solar wing $^c u_S$ — the unit vector of the Group Station s/1 — the first axis
a/2 — the second axis
w/3 — the third axis
c/4 — the imaginary axis 4201 — root index 3R; 4202 — middle index 1R;
4203 — leaf index 1R; 4204 — root thumb 3R;
4205 — middle thumb 1R; 4206 — leaf thumb 1R;
4207 — wrist 2R; 4208 — elbow 2R;
4209 — shoulder 3R $l_1$ — the length of link 1
$l_{1_I}$ — the distance between the interial center of link1 and the origin of axis 1
$l_{2_I}$ — the distance between the interial center of link2 and the origin of axis 2
$\{m_i | i \in A\}$ — mass squence
$^i g_{iI}^T = [0, 0, -g]$ — the gravity acceleration vector $r_1^i$ — the displacement of joint 1
$k$ — the elastic coefficient of spring
$l_2$ — the length of mass pendulum
$\phi_2^1$ — the swing angle of the pendulum
$\{m_i | i \in A\}$ — mass sequnce $^i k_{\bar{l}}$ — the kinematic chain of the axis $\bar{l}$ $^l L$ — the closed subtree of the axis $l$ $^{D'}f_l$ — the constraint force applied to the axis $l$ by the system $D'$ $^{D'}\tau_l$ — the constraint torque applied to the axis $l$ by the system $D'$ $^i n_1$、$^1 n_2$、$^2 n_3$ — the axis-invariants $m_1$、$m_2$、$m_3$ — the mass of the axis $^{1_I} J_{1_I}$、$^{2_I} J_{2_I}$、$^{3_I} J_{3_I}$ — the rotational inertia of axis $^i n_1 \cdot \phi_1^i$、$^1 n_2 \cdot \phi_2^1$、$^2 n_3 \cdot \phi_3^2$ — the rotation of fixed axis $f_u^\perp$, $\tau_u^\perp$ — the radial constraint force and torque of the Motion-Axis $u$ $_s f_u^{\bar{u}}$, $_s \tau_u^{\bar{u}}$ — the internal friction force and torque of the Motion-Axis $u$ $_c f_u^{\bar{u}}$, $_c \tau_u^{\bar{u}}$ — the viscous force and torque of the Motion-Axis $u$ $O_l$ — the origin of axis $l$
$m_l$ — the mass of axis $l$
$^{lI}J_{lI}$ — the centroid torque of inertia of axis $l$ $O_l$ — the origin of axis $l$
$m_l$ — the mass of axis $l$
$^{ll}J_{ll}$ — the rotational inertia of axis $l$ $[\ddot{q}_d, \dot{q}_d, q_d]$ — the disired state
$[\ddot{q}, \dot{q}, q]$ — the achievable state
$M'(q)$ — nominal model of $M(q)$
$h'(q, \dot{q})$ — nominal model of $h(q, \dot{q})$
$u$ — the global linearized compensator $[\ddot{q}_d, \dot{q}_d, q_d]$ — the disired state
$[\ddot{q}, \dot{q}, q]$ — the achievable state
$M'(q)$ — nominal model of $M(q)$
$h'(q, \dot{q})$ — nominal model of $h(q, \dot{q})$
$u_f$ — disturbance
$u'_i$ — nominal model of $u_i$
$u_c$ — a stable servo feedback controller

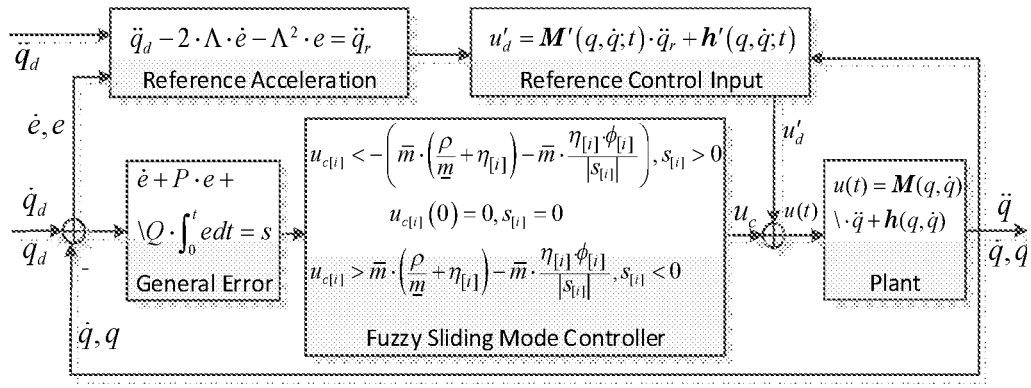

$u_c^{[i]}$ — the ith control input
$q$ — the system state
$\overline{m}$ — the least upper bound
$\underline{m}$ — the greatest lower bound
$e$ — the system deviation
$N_{[i]}(s_{[i]}, \phi_{[i]})$ — the neighborhood of the sliding model surface
$s$ — the generalized error
$\dot{s}$ — the sliding model superplane
$\ddot{q}_r$ — the reference acceleration
$\phi_{[i]}$ — the boundary thickness of the sliding model
$\Lambda$ — the position definite diagonal matrix of n×n, where $P = 2\Lambda$, $Q = \Lambda^2$
$\rho$ — the error of the system model

Fig. 53

$u_c^{[i]}$ — the ith control input
$\overline{m}$ — the least upper bound
$\underline{m}$ — the greatest lower bound
$\rho$ — the error of the system model
$\phi_{[i]}$ — the boundary thickness of the sliding model
$N_{[i]}(s_{[i]}, \phi_{[i]})$ — the neighborhood of the sliding model surface

AXIS-INVARIANT BASED MULTI-AXIS ROBOT KINEMATICS MODELING METHOD

FIELD OF THE INVENTION

The invention relates to a robot, a robot autonomous control system and a method used in autonomous robot control system, especially with regard to a multi-axis robot, multi-axis robot autonomous control system and multi-axis robot autonomous control system application method.

BACKGROUND OF THE INVENTION

Robotics is currently a very popular research field. This field has been invested a great deal of science and engineering manpower in the past decades and has studied for many years. However, once the number of the axis and degree of freedom are increased to a certain number, according to the existing textbooks and known observations, modeling, calculation and control methods, they often fall into complex out-of-control, even unsolvable problems.

First, the past practices lack generalized capabilities. It often needs to re-research to establish the corresponding kinematics and mechanical model for different robots.

Second, in the past practices used in the modeling process, the symbols and languages used were often inaccurate and incomplete. It leaded to many parameters that were not taken into account in the early stages of modeling. The subsequent entire modeling processes, including programming code written, were necessary to individually consider and solve the parameters and details that were not considered before. For complex systems such as robots with more degrees of freedom, it often means that a large number of bugs are hidden in the entire modeled system. This will affect the efficiency of the entire system development, and this kind of system developed without full consideration often has many stability problems that are difficult to solve.

Moreover, when the past practices encountered a higher complexity, the amount of computation would increase substantially or even be unanswered, and the accuracy of the calculation would be greatly affected. In other words, it has become a major flaw for robots that require immediate computational control to achieve autonomous control.

Therefore, although there are many robot-related theories, there is still lack of a complete and effective desymbol framework and corresponding calculation and control methods, which can comprehensively solve problems relating to modeling, computational structures and rules in the model, forward kinematics, inverse kinematics, and mechanical calculations in the actual development of various robots.

SUMMARY OF THE INVENTION

The present invention proposes a method that can be used in various multi-axis robot desymbols, which can completely and effectively solve problems of engineering estimation and control relating to modeling, forward kinematics, inverse kinematics, and mechanical equations.

For those familiar with the field of robot desymbol, they can use the different programming tools and circuits in accordance with the description of the documents of the present invention to desymbol various multi-axis robots, the autonomous control systems used in these multi-axis robots, and computing methods performed within these autonomous control systems.

In other words, for those skilled in the art of robot desymbol, they can use the following invention to desymbol a complete robot, modify or replace the internal operation and control circuit for an existing robot, or write program codes according to the present invention to load into an already existing robot control system, and allow these program codes to achieve the technical effect of the present invention by combining with this control system. These different ways of use, as long as they conform to the spirit described in the documents of the present invention, should be considered as falling within the scope of the present invention.

It must be noted that in the current electronic and mechanical fields, the association and combination of software and hardware are very diverse. In other words, the present invention can be implemented as a robot, or a set of program codes that can be downloaded by the robot from remote, or even performing a part or all of the calculations by a computer or server other than the robot entity through the remote connection to network. The diversity of technical means should not affect the expension to which the invention should be protected, nor should it be considered that the present invention may be implemented in a method that includes program code or that appears to involve a symbolificant number of mathematical codes, thus categorized as scientific principles or mathematical methods. Since the concepts of the present invention can be implemented as a specific technical solution and solve practical technical problems, it should be considered that it truly belongs to the scope to be protected by the patent law.

Although the following description involve a lot of mathematics, these mathematics are modeling based on engineering technical view on observing the actual multi-axis robot. Moreover, a large proportion of these math codes can be converted into programmable pseudocode. These pseudocodes, including the desymboled matrix operation and equation solution, can be written as corresponding programs for different processors or circuits, or desymbol all or part of the corresponding circuit to speed up calculation.

These mathematical codes represent the actual input or output values of each joint motor of various robots, the mass, angle, position, moment of each arm section, friction between the wheel and the ground, deformation, rotation angle, and so on. In other words, what the invention can be achieved and hopefully expect to be protected is robot, robot autonomous control system, and robot autonomous control system application method, derived from this series of complete inventive concepts, rather than superficial mathematical or physical principles. It belongs to the subject of patent.

Since this entire invention is complicated, this patent specification will explain the steps of each section as much as possible. Moreover, because the method involved in the entire invention is dealing with a complex system, the relevant explanation may initially seem quite complicated. However, once you understand it, you will find that these seemingly complicated expressions and different calculation methods from the past can greatly reduce the complexity.

Through the methods described below, it can completely cover various of different looking survey vehicles, tools robotic arms and bionic robots, and use the same logic and language to establish a model. In addition, it is possible to have clear and simple steps regardless of the most important forward kinematics, inverse kinematics, or mechanical equation solving in the field of robot desymbol through the methods described below, and write the corresponding code or circuit according to these operating procedures to complete the specific robot technology program. Moreover, these calculations are due to the inventor's comprehensive observation of the nature of the technical problems with the multi-axis robots, so that find out the key points that has a lot of research but no one specifically find out, including models from axis-invariant, constructing forward kinematics, inverse kinematics, equations of motion and solving. Perceive problems that others do not notice, and propose ways to solve technical problems, and this technical means can plinkuce unexpected effects. All these should be unobvious, and further enough for the invention to have patent law advancement.

The following describes the main features of the principle of the present invention. Those skilled in the art of desymboling robots can refer to the complete description attached to the embodiments, and desymbol the multi-axis robots, multi-axis robot autonomous control system, or multi-axis robot autonomous control system application method conforming to the concept of the present invention according to various desymbol requirements after the understanding.

First, the present invention proposes a complete observation method for multi-axis robots. For this observation method, the different components of various multi-axis robots, even the joints that look different, can be described in a complete set of pictorial symbols and languages in a complete isomorphic manner.

In other words, given a specific multi-axis robot, such as prospecting vehicle, robotic arm of machine tool, and bionic robot, desymbolers can quickly and completely describe this multi-axis robot. This set of symbols and language helps to describe the problems involved in kinematics and mechanics of the entire robot. However, it must be explained that the inventor has successfully desymboled a variety of different multi-axis robot autonomous control systems by utilizing the pictorial symbols and language, and corresponding kinematics and mechanics. General desymbolers can also use this set of symbols and languages directly. However, even if the user uses a symbol name that looks different, as long as the inventive concept disclosed in the present invention is satisfied, it should also belong to the scope of the present invention.

The desymbolers can convert various joints of a multi-axis robot into equivalent multiple translational and rotational axis through this set of clearly illustrated symbols and languages. There can be a directed Span tree and a partial order kinematic chain between these axes. The following detailed description of the invention will explain the symbols and languages of these reference contemporary set theory desymbols. Not only does it have an isomorphism relationship with the concerned robot system, but also constitutes a complete model in itself. In order to prove and show the completeness of this language system, we even provide the derivation and proof of the relevant axioms in the patent specification document.

This topological space consisting of kinematic chains can carry out the following description of the motion axis symbols and operations, and these operations will meet the physical characteristics of a corresponding real robot. For example, for a multi-axis robot with three links connected by two rotational axis, when the motors inside these rotational axis rotate by a set angle, the relative positions of the three links will interfere with each other. At this point, how to calculate from one position the ends of the three links move to other position belongs to the forward kinematics in robotics. This involves iterative calculations between multiple axis coordinate systems. The desymbolers can see the technical features of these symbol systems and the present invention in the corresponding sections below, such as how to apply the characteristics of axis invariance to operate and calculate various technical problems in forward kinematics. The desymbolers can write corresponding program codes or desymbol corresponding circuits according to different desymbol requirements after reading these instructions. The desymbolers should be able to obtain relevant information in the general electronic circuit desymbol and programming reference books about the details of these programming code or different methods of circuit desymbol. The document of the present invention does not make a redundant description of the program code or circuit desymbol of these details.

In addition, if a corresponding result has been set, for example it is desirable to move the end suction cup of the multi-axis robot to a specific position judged by a multi-axis robot using machine vision such as camera to pick up an object. At this time, how to set the rotation or movement angle of each axis joint motor constitutes the main problem of inverse kinematics.

Without a doubt, in addition to calculating the amount of axis operation corresponding to a specific position of different links of a multi-axis robot, some links have inherent limitations. For example, it will be blocked by a certain shell when moved to a relative coordinate angle during movement, or some of the working environment belong to areas where some links cannot enter. These limits can be used as limiting parameters in inverse kinematics solution.

These operations involve a large number of coordinate iteration calculations and solutions. For example, the following implementation section will explain how to calculate the key D-H parameters in robotics more efficiently with Axis-Invariants. Moreover, the method of the present invention can effectively calculate the corresponding solution of the higher order multivariate equations. These solutions correspond to the actual operation displacement or rotation angle of each axis joint. Therefore, it is not only a scientific principle or a mathematical formula, but a real application and is also a technical solution that the inventor wants to protect.

The correlation matrix operations constructed under the Axis-Invariants and the operation of the solution equations for the target position, these inverse kinematics can all find a more efficient calculation method through the linguistic symbol system of the present invention than the current inverse kinematics. As mentioned above, these operation methods can be written as corresponding program codes or circuits.

It must be noted that even if the desymboler uses an operation method with a different name but the same substantive meaning to desymbol a corresponding control code or circuit, it should still belong to the scope of the present invention. Again, it is emphasized that the scope of the present invention is not limited to the provided language symbols.

The inventor provided a concrete survey vehicle implementation example to prove the concrete feasibility of this set of methods through such forward kinematics and inverse kinematics.

The inventor further constructed a set of mechanical equations of multi-axis robot based on kinematics and the characteristics of the language symbol system and related Axis-Invariants through the following implementation description. With this complete set of mechanical equations, given the first part of the known variable values in the set of mechanical equations, one can find the values of other variables by solving the set of mechanical equations. For example, it is possible to estimate the force at different positions of the multi-axis robot by inputting the mass of the multi-axis robot member, the movement of each axis joint, the rotation speed, the acceleration, etc. in this mechanical equation. In addition, like the problems to be solved by inverse kinematics, this set of mechanical equations can also be used to calculate how to control the motor output power of each axis joint when a multi-axis robot wants to apply force or force to a certain target point.

Although there have been some mechanical equations used to calculate the field of robots in the past, the mechanical equations proposed for the multi-axis robots of the present invention are obviously superior to the traditional mechanical equations regardless of the computational efficiency or the solvable dimension.

In addition, for the kinematics or mechanics operations proposed by the present invention, the desymbolers can find from the following description that a very large number of operations are based on concise language symbols and corresponding matrix operations. The characteristics of these language symbols and the corresponding matrix operations make these operations easily correspond to pseudocode. The desymbolers may even find that a large proportion of the calculations behind most pseudocode can be calculated in parallel. In other words, current multiprocessor circuits with corresponding coding can finish the entire kinematics or mechanics calculations in a very short time. This has very practical significance for the need to obtain results in real time in order to use these results for multi-axis robot parameter setting, such as for motor control current settings.

For example, even if the past mechanical equations can calculate the same solution and solve the problem for the needs of the autonomous control system, if it cannot calculate immediately within the calculation time limit of the hardware circuit, a useful robot autonomous control system cannot be successfully constructed.

Therefore, this invention can be implemented in various different forms and therefore has various different ranges. The actual scope refers to the scope defined in the claims section, and related patent cases for this invention.

For the robot control system, it is very valuable to fully grasp the parameters and details. For example, a survey vehicle is placed on the surface of the disaster area or even on the moon surface, if it judges incorrectly due to desymbol flaws, the loss caused may be a very high price.

In addition, it is very valuable to be able to use a uniform symbology and corresponding kinematics and mechanical equations to desymbol robot systems that may look completely different. For example, the robot control circuit used on the survey vehicle can be directly placed on the robot arms of various tool machines by just setting and adjusting some parameters. This is a great benefit to the production cost and complexity of processing chips.

Moreover, the desymboler can understand through the following description that the technical solution proposed by the present invention for the technical problems encountered in the desymbol of the robot has more advantages than the existing desymbol framework both in terms of computational efficiency and stability.

Based on the chain theory and tensor analysis theory of contemporary set theory, the present invention establishes a chain topological symbol system with a stringent kinematics chain index system and a kinematic chain coordinate system adapted to contemporary computer symbolic calculations. The theory of multi-body kinematics, dynamics modeling and autonomous behavior control based on chain topological calculus symbol system is constructed.

Autonomous behavior control is based on the kinematics and dynamics of multi-axis systems, contemporary computers, etc. To realize the autonomous behavior of various robot systems must follow the laws of the system itself and the external environment. However, the symbol systems in different fields are not the same. For example, there is no consistent mechanical drawing language, 3D model language, professional symbol language, and there are huge obstacles in integrating these symbol systems. Due to the lack of consistent engineering specifications and technical languages, there are obstacles in the exchange of information in different areas and it is difficult to guarantee the quality of various robots.

The design of these robots depends on the integration of contemporary mathematics, mechanics, astronomy, and computer science. In other words, to design a reliable control system, it is necessary to establish a set of theory for autonomous modeling and controlling of multi-axis systems adapted to the characteristics of contemporary computer technology.

In the present invention, the multi-axis system kinematics and dynamics modeling and autonomous behavior controlling not only realize the parameterization of the system topology, coordinate system, structural parameters and dynamic parameters, but also ensure the accuracy and real-time performance of the calculation and measurement. Thus, the modularization of modeling and controlling is achieved, which improves system integration efficiency and engineering application reliability and inheritance.

Simultaneously, the Axis-Invariant kinematics and dynamics model realizes the parameterization of the system topology (connection relationship), reference systems, polarities, structures, and mechanical parameters. It is a versatile, highly efficient, robotic kinematics and dynamics system that can be directly translated into computer code, and is the basis for robot autonomous control. The computer can perform kinematics and dynamics analysis due to computer-readable symbol system, and the system has a mechanism to autonomously determine the correctness of inference conclusions, which can greatly improve the robot's intelligence in analyzing and solving kinematics and dynamics problems.

Whether it is a complex celestial system or a complex spacecraft system, they all have an objective topology. The topology is based on the tree chain. The integration of mechanics, astronomy, and computer theory can not only unify the symbolic representation and calculation of complex large systems, but also produce many innovative theoretical and engineering technological achievements through the tree chain.

The present invention follows the philosophical principle of isomorphism, and bases on the principles of topology order immutability, tensor invariance and duality of metrics, mechanized modeling and calculation. It establishes a kinematics and dynamic equation of a multiaxial system based on Axis-Invariants that is adapted to contemporary computer for symbolic calculus and has a kinematic chain symbol calculation system. On the one hand, the parameterization of the system topology, coordinate system, structural parameters and dynamic parameters is realized. On the other hand, it is an iterative method of Axis-Invariants in three-dimensional (3D) vector space, which ensures the accuracy and real-time of calculation. It has the function of computer pseudo code to ensure the correctness and reliability of the project implementation at the same time. Based on it, the study of multi-axis system autonomous behavior control is conducted. Computer autonomously completes numerical and explicit modeling of kinematics and dynamics of multi-axis systems, and solves forward kinematics and negative kinematics, forward dynamics and negative dynamics. The invention can indirectly sense the status of the multi-axis system and the environment and indirectly sense the force of the multi-axis system and the environment. The invention can improve the absolute positional accuracy and dynamic response of the system, suppress the vibration and realize the system weight reduction. Thus, the present invention can improve the autonomous behavior capability of the multi-axis system and provide friendly, efficient, and high-quality operations and services.

The chain theory of contemporary set theory is a partially ordered set theory, and the universal law of the objective world including tree chain system. The chain theory not only applies to the action relationship of the kinematic chain, but also applies to the action relationship of the action chain. The tensor analysis theory is a mathematical tool for the study of continuous medium particles and field theory. It has Einstein indicator system. The invention uses the chain theory of contemporary set theory and the tensor analysis theory to build a kinematic chain symbol calculation system, and translate the kinematics and dynamics theory of multi-body systems traditionally dependent on natural language annotations and mathematical language descriptions into a 3D operational algebraic theory system based on chain symbology. The theory used to construct the invention has the following characteristics:

First, the present invention provides a kinematic chain symbol calculation system with chain order as the core. On the one hand, the connotation of kinematic and dynamic physics attributes are accurately expressed through the specification of symbol systems with chain indicators. On the other hand, the intrinsic order laws of kinematics and dynamics of the kinematic chain are succinctly expressed.

Second, the 3D operation algebra system of the present invention has a chain index. The difference between operational algebra and operator algebra is that: Operational algebra contains both matrix operations for numerical calculations and tree chain topology operations. Thus, the adaptability of the multi-axis system with the variable topology, the compactness of the spatial operation, and the understandability of the operation are enabled. It avoids $6d$ spatial operator algebra depending on system topology integration, the complexity of spatial operations and decomposition, and the abstraction of spatial operators. It is suitable for the kinematics and dynamics modeling of multi-axis systems with variable structure.

In addition, the present invention provides a 3D operational algebra system with natural axis chains. The forward iteration of the motion and the reverse iteration of the force action are the basic characteristics of the tree chain topology. The multi-body system is essentially a multi-axis system. The kinematic pair is the constraint between the axis. The kinematic chain is the axis chain. The common unit Axis-Invariant of the kinematic pair is natural reference axis and has natural invariability, so the unit invariant is called Axis-Invariant. Axis-Invariants and corresponding natural coordinates determine the unique natural coordinate system of the corresponding axis. The kinematic chain based on the Cartesian coordinate system is essentially a Cartesian coordinate axis chain system, which is a special case of the 3D operation algebra of the natural axis chain.

Moreover, the present invention has a fixed Axis-Invariant structural parameters and a natural coordinate system. On the one hand, it solves the method problem of the exact multi-axis system structural parameters. On the other hand, it also solves the problem of automatically determining D-H Frame and D-H parameters based on fixed Axis-Invariants, and solves the real-time establishment problem of the universal kinematics equations for 6-axis reversible solutions and real-time inverse solution calculations.

Furthermore, the kinematics and dynamics equations of the multi-axis system constructed by the present invention have an invariant iterative method. The present invention unifies the fixed-axis rotation of the 3D space, the Linkrigue quaternion, the Euler quaternion, and the dual quaternion of the 4D space by the Axis-Invariants, and solve the double-vector attitude, motion rotation and force rotation in 6D space. The present invention establishes an iterative method based on Axis-Invariant displacement, velocity, acceleration, and partial velocity. The present invention establishes an axis-invariant-based Ju-Kane dynamics equation for rooted tree chains and closed chains, unrooted tree chains and closed chains. The kinematics and dynamics equations of multi-axis system are related to the parametric equations of multi-axis system topology, coordinate system and polarity, structural parameters and motion parameters, with the accuracy and real-time of the forward and reverse solutions. They have the pseudo code function of the chain index. The axiomatization theory system based on topological axioms and metric axioms ensures the correctness and reliability of modeling of complex systems.

This whole set of techniques can be used to make a robot control system, which complete calculations some or all in the robot's control circuits, or partial or complete at a remote server or in an external computer device. In addition, the whole set of techniques can be used to create analysis tools that the designers can use to analyze and verify the correctness of a designed machine system, or to perform iterative design. In other words, this whole set of techniques can be made into a complete set of tools. Moreover, as will be understood from the following description, the model mentioned in this complete system has excellent extensibility. In other words, a number of robotic modules constructed based on the whole set of system can be stacked and combined, and they can still be controlled and analyzed with the same technical solution. Furthermore, because this whole set of technical solutions has a supporting concise symbol system, this symbol system can be designed to corresponding program code and function library. This whole system is easy to model. Besides, even if there is any error in the system, it can still maintain certain operational capabilities through sensor's feedback or engineering staff's adjustments. In other words, this technical solution has very good fault tolerance.

According to an embodiment of the present invention, it provides a control method for controlling a multi-axis robot device. The multi-axis robot device includes a Link Set and a joint set, and the links in the Link Set are combined with the joints in the joint set. The control method includes the following steps:

Convert the joint set to the corresponding Link Set. One joint in a joint set corresponds to a subAxis Set of Axis Set. The axis of the axis set is a translational axis or a rotational axis.

Use the axis set to describe the multi-axis robot device correspondingly. Calculate control parameters of the multi-axis robot device using Axis-Invariants corresponding to the axes of Axis Set. Among them, for two links of one axis, the Axis-Invariant of this axis does not change with the corresponding joint motion, and use the calculated control parameters to control the multi-axis robot device In some embodiments, the method may further includes converting the joint set into the corresponding data of the axis set stored in the memory of the control circuit.

In some embodiments, the data corresponding to the axis set, which corresponds to the description of multi-axis robot device, is stored in the memory of the control circuit. The update calculation of the control method is directly adjusted by modifying the corresponding data in the description. In other words, it is different from the traditional model, which needs to be re-modeled and complex debugging calculating while the setting is changed. It only need to directly provide adjusted parameters to create a new model directly through this system.

This feature enables mass production of parts of machinery and equipment to reduce costs, and can maintain the flexibility of assembled multi-axis robot installations at the same time. Any adjustment can quickly react and accurately complete the new set of modeling and related calculations.

In some embodiments, the axis sets are used to describe the multi-axis robot device correspondingly, and the Axis-Invariants corresponding to the axis of axis set are used to calculate the control parameters of the multi-axis robot device. For two links on one axis, the Axis-Invariant of this axis will not change with the corresponding joint motion.

This method may also include sensor measurement data for the joints of the joint set. Calculate at least one forward kinematics parameter of the multi-axis robot device in combination with the axis invariability of the axis set to predict the trajectory of the multi-axis robot device.

In addition, the control method further includes autonomously operating the multi-axis robot device against the preset rules according to the motion trajectory corresponding to the joint set and the links.

In other embodiments, the control method may further include solving the equation of motion corresponding to a given trajectory of a multi-axis robot device, and finding out the control parameters of the joint corresponding to the joint set given the motion trajectory. The following content will specifically illustrate the calculation of the relevant equation of motion.

In addition, this control method may also include sensor measurement data for the joint of joint set, and calculating at least one mechanical parameter of the multi-axis robot device in combination with the axis invariability of the axis set to predict the force of each part of the multi-axis robot device.

In other embodiments, the control method may also include solving the mechanical equation corresponding to the given mechanical parameter of the multi-axis robot device, and finding the control parameter of the joint in the joint set corresponding to the given mechanical parameter.

In addition, the axis set may correspond to a directional expanded tree structure. Moreover, when there is a non-tree connection relationship between some axes in correspondence to the directional expanded tree structure, the combination is recorded as a non-tree link combination.

This multi-axis robot device integrally corresponds to the axis set through a one-to-one isomorphism correspondence and achieves an isomorphic correspondence. In other words, when a multi-axis robot device performs a certain motion, the model created by this axis set can also find a completely corresponding operation. Conversely, performing operations on models built from this axis set is also corresponded to the motion of the multi-axis robot device.

In addition to kinematics, mechanics models can be further established on the basis of kinematics, and corresponding calculations or solutions can be performed. In some embodiments, the Link Set is further expanded into a virtual Link Set corresponding to a one-to-one correspondence with the Axis Set, such that the links of each virtual links set have exactly one-to-one correspondence with one axis of the Axis Set.

According to another embodiment of the present invention, it is provided a multi-axis robot device. This multi-axis robot device includes a plurality of joints constituting joint set, a plurality of links constitutes Link Set, and control circuit for controlling the motion of the plurality of joints. The links in the Link Set are connected through the plurality of joints. The control circuit converts the joint set to a corresponding axis set. Each joint in the joint set corresponds to the sub-Axis Set of the Axis Set. The axis of the axis set includes two types of axis: a translational axis or a rotational axis.

The control circuit uses the axis set to describe the multi-axis robot device correspondingly, and uses the Axis-Invariant corresponding to the axis of the axis set to calculate the control parameters of the multi-axis robot device. For two links on one axis, the Axis-Invariant of this axis will not change with the corresponding joint motion. The control circuit uses the calculated control parameters to control the joints of the multi-axis robot device.

The following will introduce a complete set of symbols and corresponding computing systems to correspond to and describe various multi-axis robot device.

In some embodiments, the control circuit calculates sensor measurement data for the joints of the joint sets, and calculates at least one forward kinematics parameter of the multi-axis robot device in combination with the Axis-Invariants of the axis set. It can be used to predict the trajectory of the multi-axis robot device.

In some embodiments, the control circuit autonomously operates the multi-axis robot device according to preset rules for the trajectory corresponding to the joint set and the links.

In some embodiments, the control circuit solves the equation of motion corresponding to the given motion trajectory of the multi-axis robot device to find out the control parameters of the joint in the joint set corresponding to the given motion trajectory.

In some embodiments, the control circuit calculates sensor measurement data for the joints of the joint sets, and calculates at least one mechanical parameter of the multi-axis robot device in combination with the Axis-Invariants of the axis set. It can be used to predict the force conditions of various parts of the multi-axis robot device.

In some embodiments, the control circuit solves the equation of mechanics corresponding to the given mechanical parameter of the multi-axis robot device to find out the control parameters of the joint in the joint set corresponding to the given mechanical parameter.

In addition to a control method or a multi-axis robot device, the present invention can also be as a design system for designing and verifying a multi-axis robot device based on the same technical features. This design system can be used to correlate various multi-axis robot systems to motion and/or mechanical models built with Axis-Invariants to analyze and verify the feasibility, correctness, and completeness of various designs.

The link of the analyzed multi-axis robot device has Link Set and joint set, and the links in the Link Set converge through the joints of the joint set. The design system may include an input unit for the designer to convert the joint set to a corresponding axis set. Each joint in the joint set corresponds to the sub-Axis Set of the axis set. The axis of the axis set includes two types: a translational axis or a rotational axis. For example, the designer can use an XML file as a parameter input or combine it with a computer-aided design tool (CAD) to input a new parameter through an interactive command line or an image operation interface. The design of the basic data input can refer to the technical documents in general and will not be described in detail here.

The analysis system further includes a processing unit for describing the multi-axis robot device correspondingly using the axis set, and calculating the control parameters of the multi-axis robot device using the Axis-Invariant corresponding to the axis of the axis set. For two links on one axis, the Axis-Invariant of this axis will not change with the corresponding joint motion.

The analysis system also includes an analysis unit that analyzes and verifies the design of the multi-axis robot device using the calculated control parameters.

The above processing unit and analysis unit can be partially implemented in hardware, and can also be manufactured in a combination of software and hardware. In fact, the relevant logic can also be written as code, executed in whole or in part on the user's computer or executed on a remote server.

In the actual establishment of the system, the input unit may include joint setting parameters for the joint set, and calculates at least one forward kinematics parameter of the multi-axis robot device in combination with the Axis-Invariants of the Axis Set. It can be used to predict the trajectory of the multi-axis robot device.

In the actual establishment of the system, the processing unit further comprises calculating the mechanical parameters of the multi-axis robot device using the mechanical equations constructed by the use of the axis set.

According to another embodiment of the present invention, it is provided a control method for controlling the multi-axis robot device. The multi-axis robot device includes a Link Set and a joint set, and the links in the Link Set are combined with the joints in the joint set. The control method includes the following steps:

Convert the joint set to the corresponding Axis Set. Each joint in the joint set corresponds to the sub-axis set of the axis set. The axis of the axis set includes two types: a translational axis or a rotational axis.

Use the axis set to describe the multi-axis robot device correspondingly, and use the axis set to establish a variety of different dynamics equations. The Axis-Invariant corresponding to the axis set are used in these dynamics equations.

According to another embodiment of present invention, it is provided a control method for controlling the multi-axis robot device. The multi-axis robot device includes a Link Set and a joint set, and the links in the Link Set are combined with the joints in the joint set. The control method includes the following steps:

Convert the joint set to the corresponding axis set. Each joint in the joint set corresponds to the sub-axis set of the axis set. The axis of the axis set includes two types: a translational axis or a rotational axis.

Use the axis set to describe the multi-axis robot device correspondingly, and use the axis of the axis set to calculate the corresponding Axis-Invariant. For two links on one axis, the Axis-Invariant of this axis will not change with the corresponding joint motion.

Construct the iterative kinematics equations based on Axis-Invariants using the invariance of Axis-Invariants. Besides, the symbols of the iterative kinematics equation correspond to pseudo-codes and can clearly reflect the topological relationship and the chain-order relationship of the multi-axis robot device kinematic chain. The calculated control parameters are used to control the multi-axis robot device.

In some embodiments, an iterative calculation using quaternions with orthonormality in the iterative kinematics equation instead of a rotational transformation matrix is used to increase the accuracy of the calculated parameters. Comparing with the traditional iterative calculation which directly uses the rotation transformation matrix, this approach can avoid erroneous accumulation and greatly increase the accuracy and stability of the overall system.

In addition, in the iterative kinematics equation, an Axis-Invariant may be applied to express the rotation as a rotational vector.

In some embodiments, the iterative kinematic equation has natural null axis and system null axis. The Axis-Invariant has excellent operating performance in 3D space and 4D space, satisfies kinematic chain axiom and metric axiom, and has pseudo-code function with accurate physical meaning.

In some embodiments, the rotational transformation matrix used to calculate rotational motion parameters in the iterative motion equation can be represented by an Axis-Invariant.

According to another embodiment of the present invention, it is provided a control method for controlling the multi-axis robot device. The multi-axis robot device includes a Link Set and a joint set, and the links in the Link Set are combined with the joints in the joint set. The control method includes the following steps:

Convert the joint set to the corresponding axis set. Each joint in the joint set corresponds to the sub-axis set of the axis set. The axis of the axis set includes two types: a translational axis or a rotational axis.

Use the axis set to describe the multi-axis robot device correspondingly, and use the axis of the axis set to calculate the corresponding Axis-Invariant. For two links on one axis, the Axis-Invariant of this axis will not change with the corresponding joint motion.

The kinematic model of this multi-axis robot device is constructed through Axis-Invariants, and the calculation result is directly superimposed with another connected multi-axis robot device to calculate the kinematic parameters of the combined multi-axis robot device.

In other words, in the framework of Axis-Invariants, a complex system can be divided into multiple parts to calculate. On the one hand, these separately calculated partial machine modules can also combine the results of operations to form a complex overall result. On the other hand, it can also be calculated together by the following different methods.

For example, this method may provide a hardware or software interface for superimposing parameters of one multi-axis robot device and another multi-axis robot device to directly measure the kinematic parameters of the combined multi-axis robot device.

In other embodiments, the multi-axis robot device and the other multi-axis robot device can be switched between separation and combination, and they can be controlled by the same control circuit after combination.

Another operation mode also includes switching between the separation and combination of the multi-axis robot device and the other multi-axis robot device, and after the combination, it is controlled by a plurality of control circuits located in two multi-axis robot devices through a cooperative operation.

Alternatively, the control method may further include detecting whether the multi-axis robot device is combined with another multi-axis robot device and automatically starting the combined superposition calculation.

In some embodiments, the control method may further include detecting error between actual motion parameter and estimated motion parameter of the multi-axis robot device, and using the error to readjust the kinematic model. This is particularly important to autonomously operated machine installations, because all machinery and equipment are subject to errors at the time of manufacture. Besides, if the parts used in the process are old or damaged, they may produce various unpredictable changes. These changes can be measured by the detection of some locations. The results of these measurements can be compared with the calculations made by the model built from the Axis-Invariants. The errors found in the comparison can be fed back to adjust the model of the axis invariance to achieve a certain fault-tolerance capability of the entire system and enhance the stability of the overall system.

In other words, when the multi-axis robot device has a partial failure or deformation, the kinematics model is used to calculate the relevant kinematics parameters through the readjustment.

In addition, through the following description, the corresponding symbols in the kinematics model can be found that they correspond to pseudo-code, and are written into the corresponding software or circuit. Therefore, the entire kinematic model can be calculated by calling the circuit or code corresponding to the pseudo code.

Moreover, in some embodiments, the control method may include an interface for communicating with application layer code to perform functions of autonomous machine operation.

There are many uses of robots. One of them is the control of manufacturing robots used in factories. At this time, the kinematics model can be used together with the measurement parameters of the external measuring instrument to substitute the operation of the equipment to be assembled, and to control of the multi-axis robot device to achieve the function of the manufacturing robot.

This control method can also use the motion parameters to be substituted into the mechanical equations to calculate the strength of each component of the multi-axis robot device. In other words, from the kinematic parameters, it is possible to deduce the forces tolerated and thus to control the multi-axis robot device more precisely and effectively. This is a great help for robots to work more effectively. Current machine systems often require a fixed base or heavy weight because of the inability to calculate complex mechanical parameters.

In contrast, the present invention is based on Axis-Invariants to establish a concise and computational kinematics model and a mechanical model to calculate various parameters required for control or analysis.

Therefore, the bottom layer of the robot control system that was difficult to establish in the past can be constructed through the present invention. Moreover, such a bottom layer has a very concise representation mode that can be directly converted to the corresponding code or circuit and optimized.

BRIEF DESCRIPTION OF THE DRAWINGS

FIG. 3 is a comparison diagram of the identifiers, types and diagrams of kinematic pair within the system.
FIG. 4 is a comparison diagram of the identifiers, types and diagrams of kinematic pair outside the system.
FIG. 5 is a diagram of the basic structure identifies.
FIG. 22 is a radial projection and a natural zero bitmap.
FIG. 25a is a vector diagram of the vector before the axis rotation.
FIG. 25b is a vector diagram of FIG. 25a after the axis rotation.
FIG. 29 is the Axis-Invariant precision measurement principle.

FIG. 53 is a diagram of fuzzy variable structure control frame.

Figure 1:
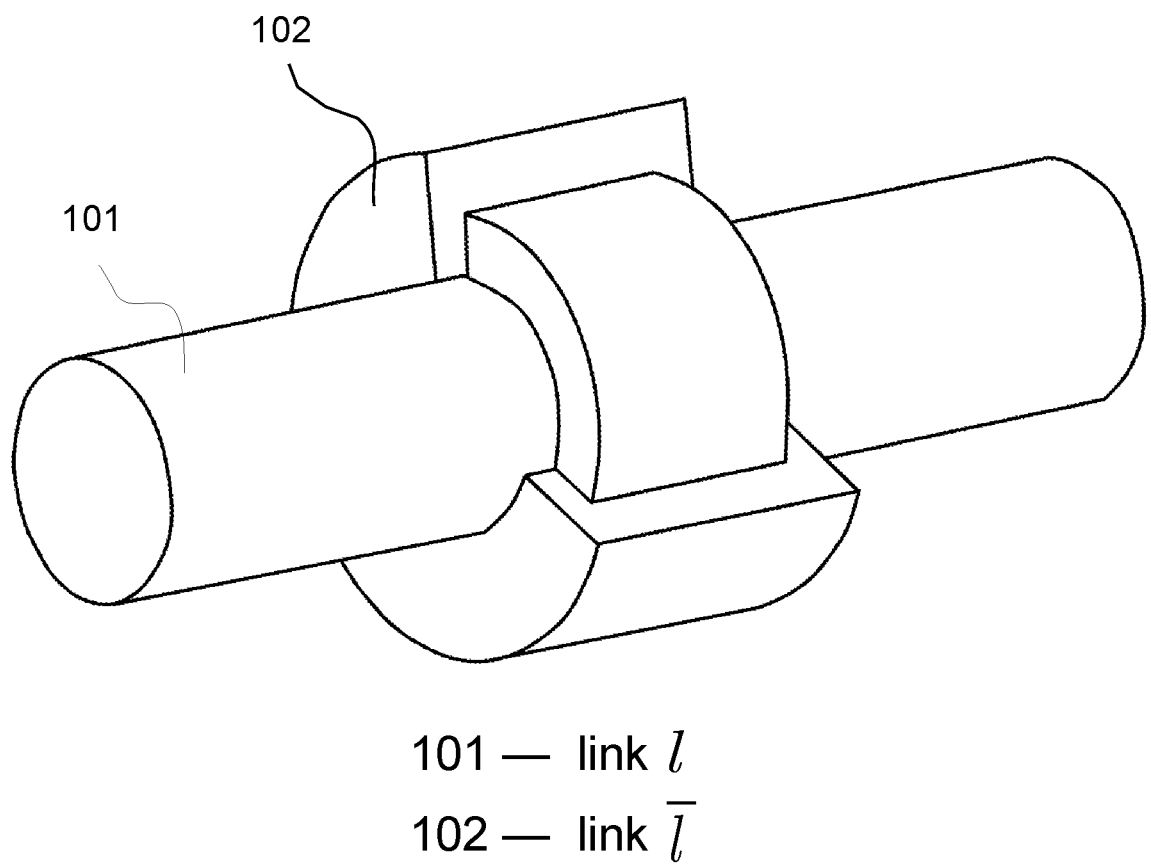
FIG. 1 is a structure diagram of the kinematic pair.
Figure 2:
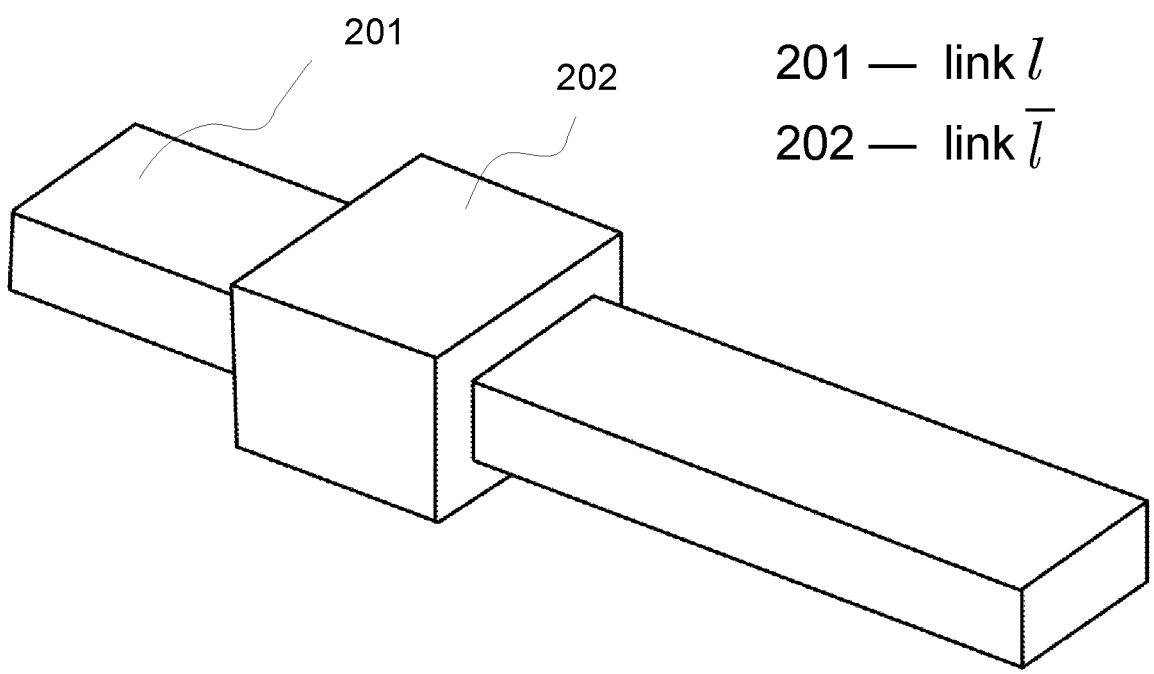
FIG. 2 is a structure diagram of the prismatic pair.
Figure 6A:
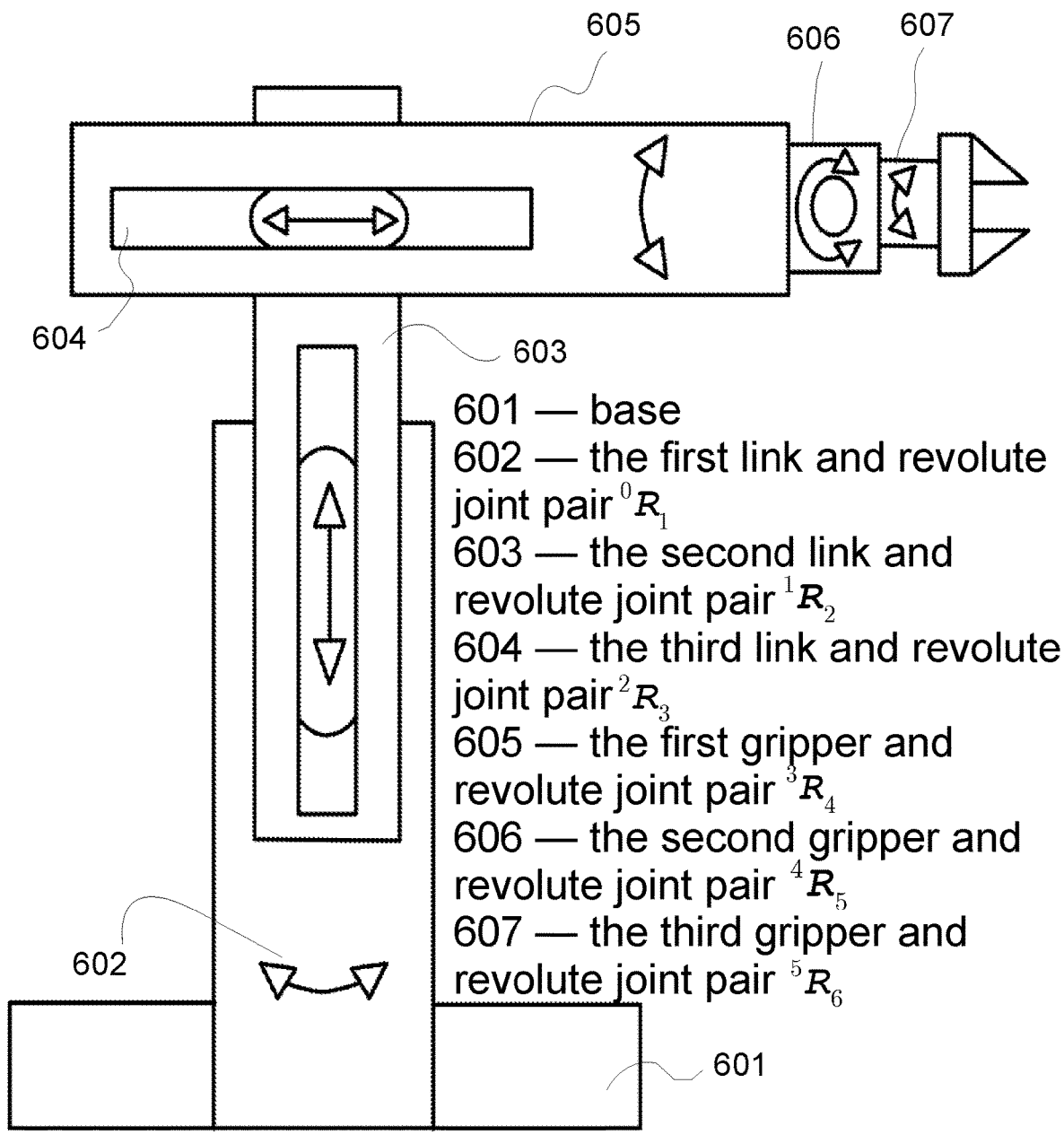
FIG. 6a is a diagram of the cylindrical robot arm.
Figure 6B:
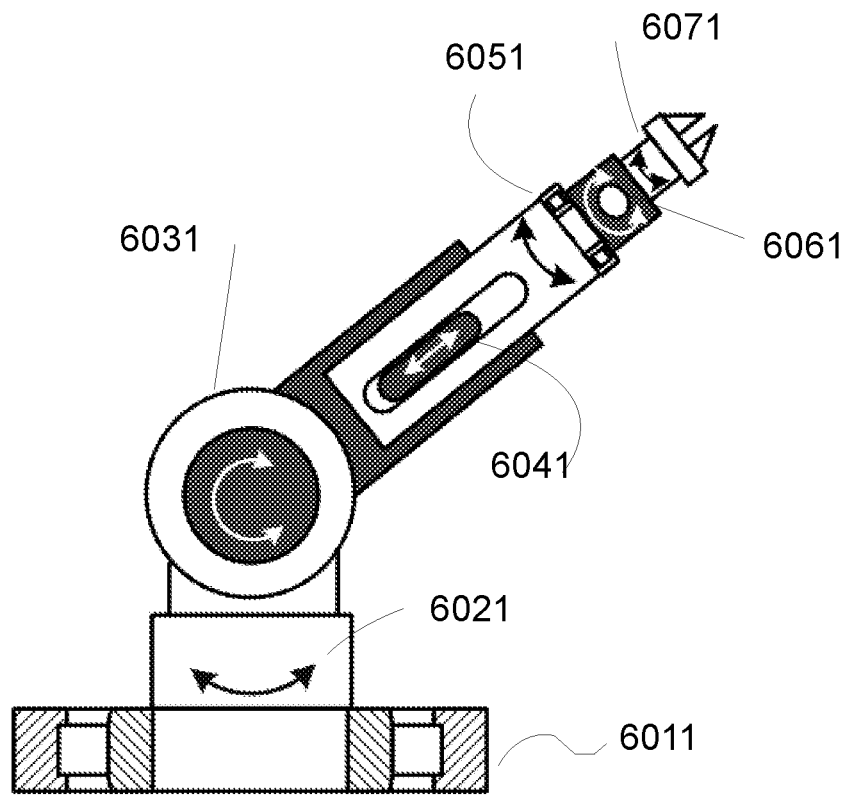
FIG. 6b is a diagram of the spherical robot arm.
Figure 6C:
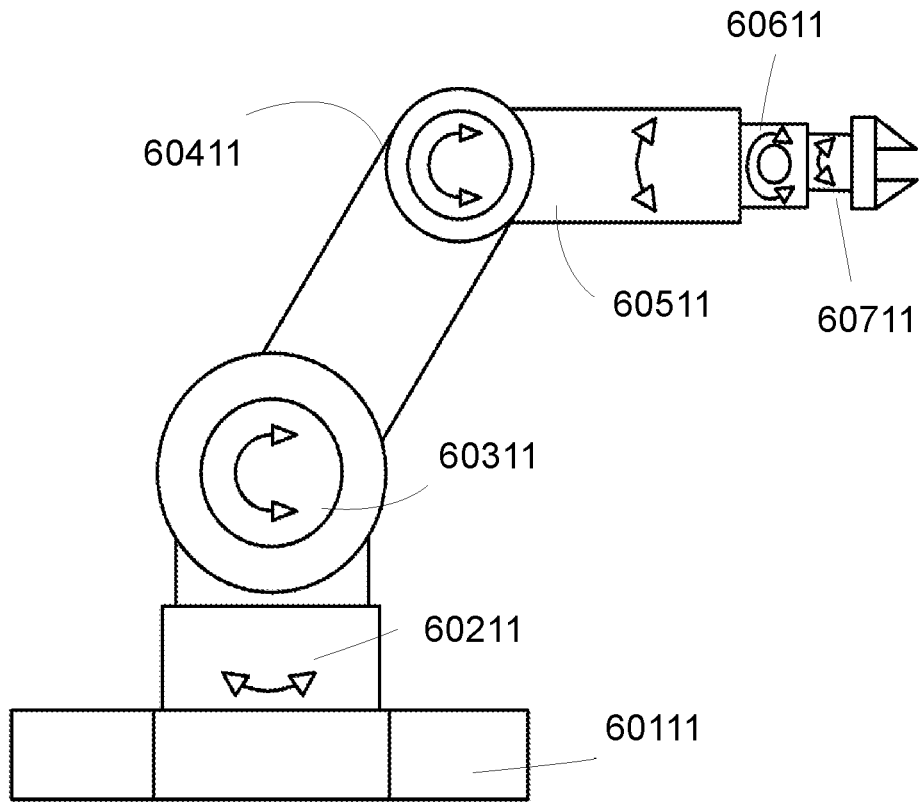
FIG. 6c is a diagram of the rotary robot arm.
Figure 7:
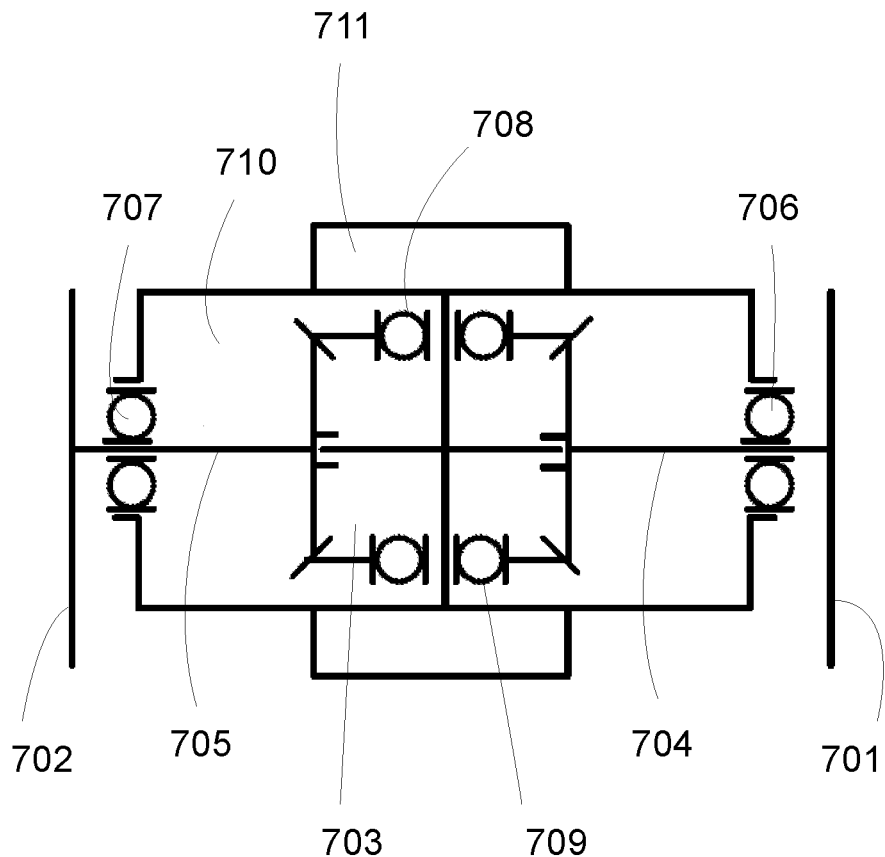
FIG. 7 is a structure diagram of the wheelset differential mechanism of rocker-type six-wheeled robot.
Figure 8:
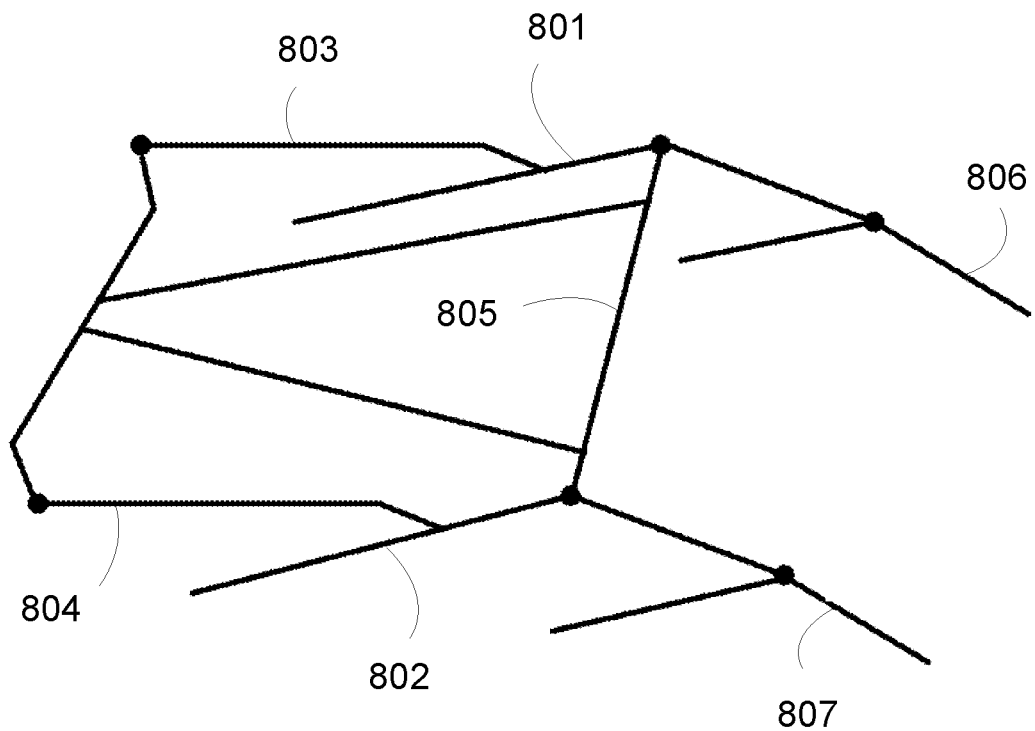
FIG. 8 is a structure diagram of the linkset differential mechanism of rocker-type six-wheeled robot.
Figure 9:
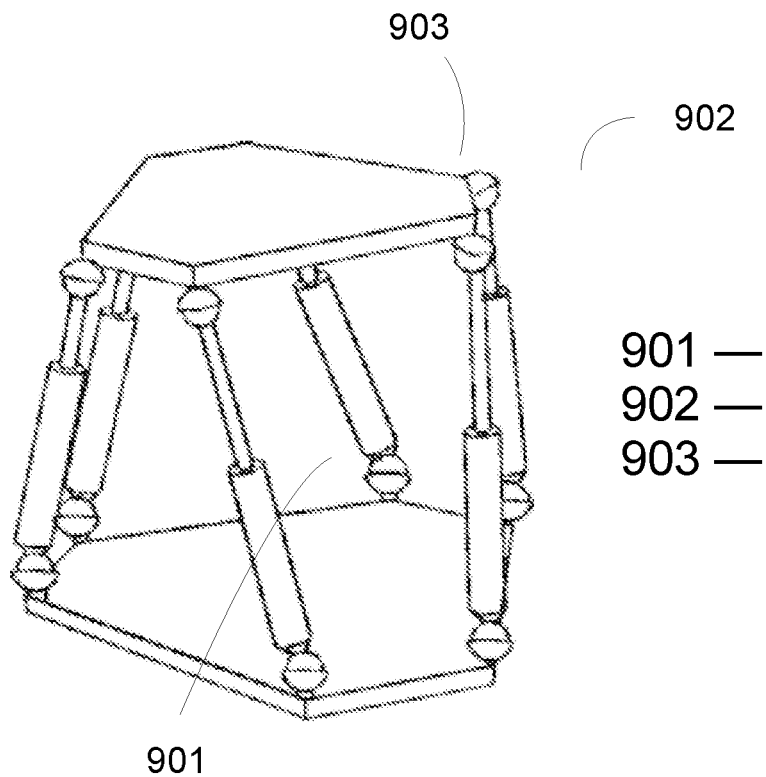
FIG. 9 is a diagram of the closed-chain type robot.
Figure 10:
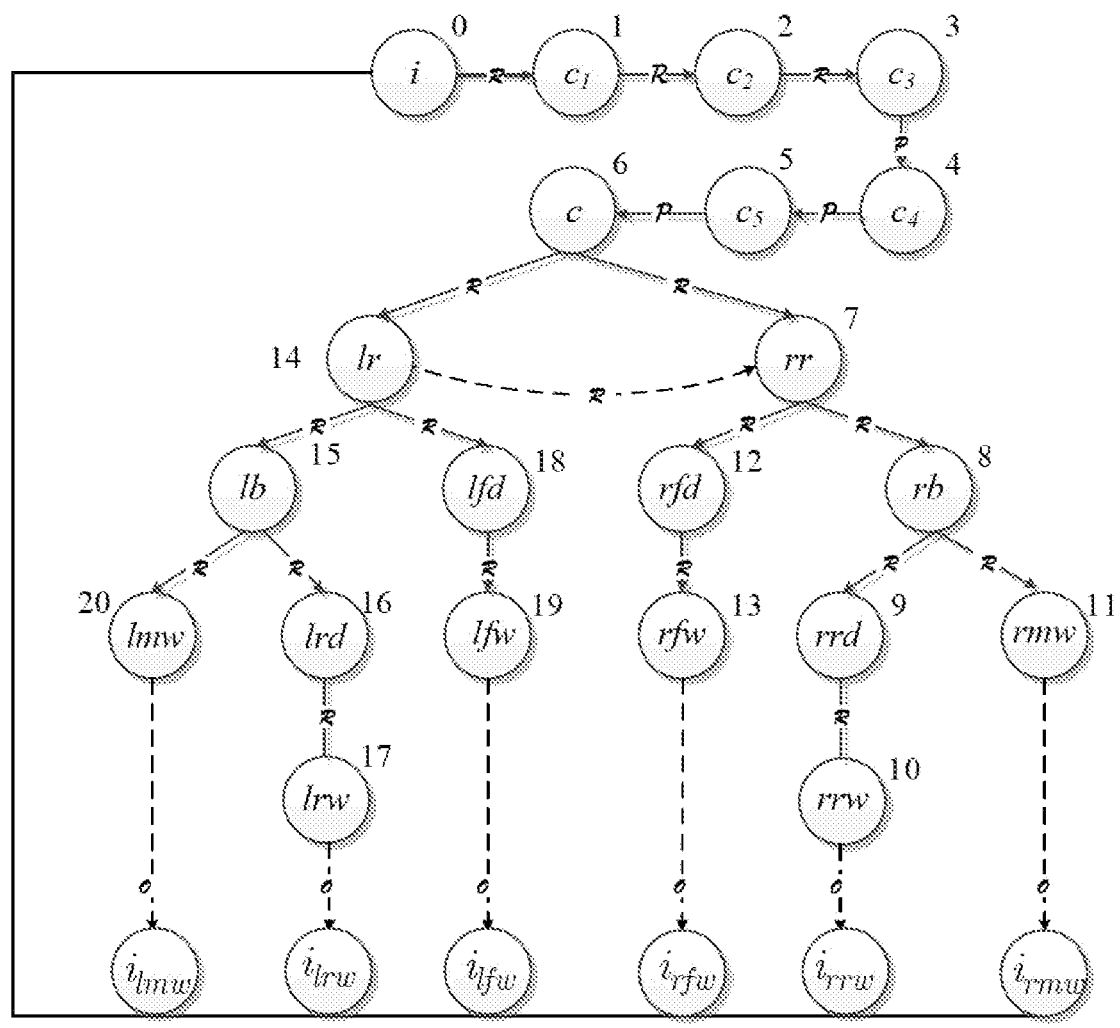
FIG. 10 is a directional Span tree diagram of the CE3 lunar rover axis chain.
Figure 11:
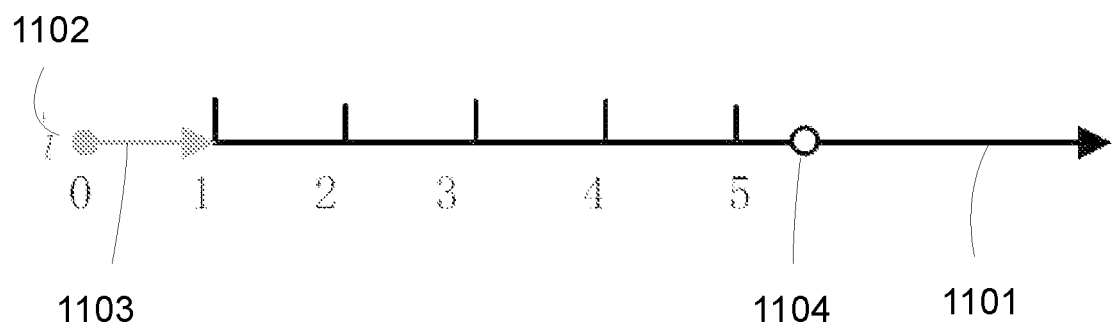
FIG. 11 is a diagram of axes and base vector.
Figure 12:
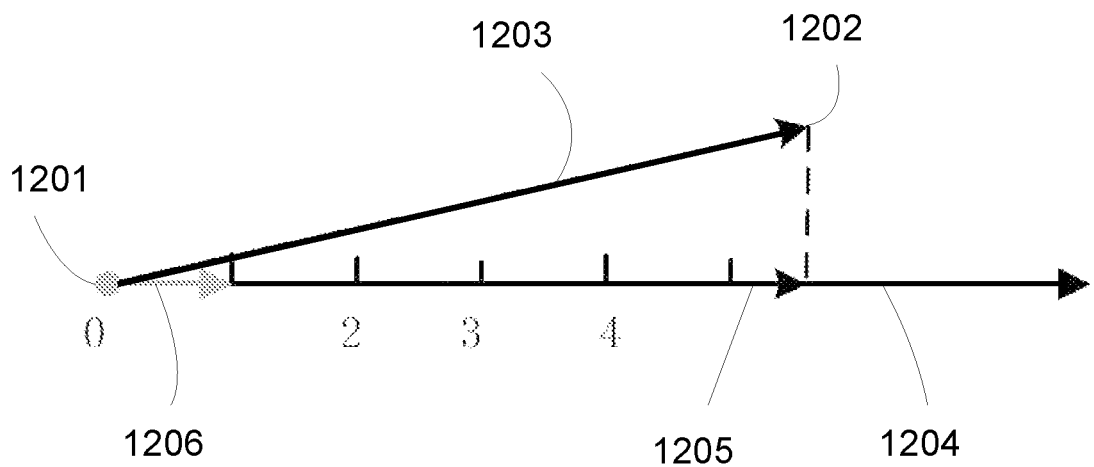
FIG. 12 is a projection vector diagram of vector.
Figure 13:
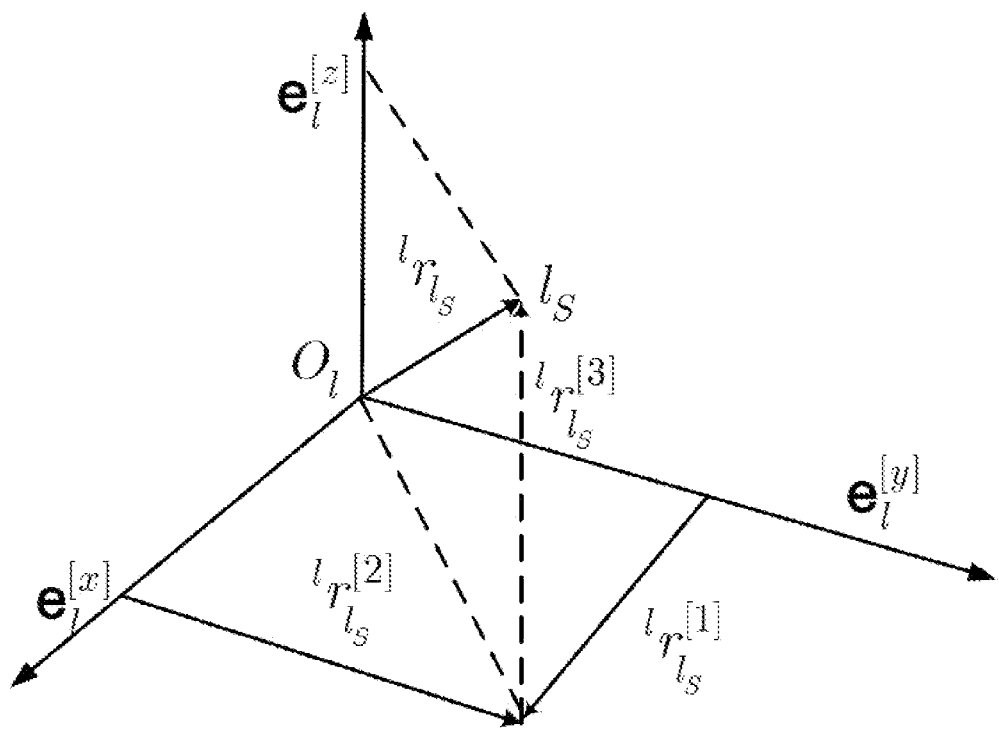
FIG. 13 is a projection vector diagram of vector in the cartesian coordinates system.
Figure 14:
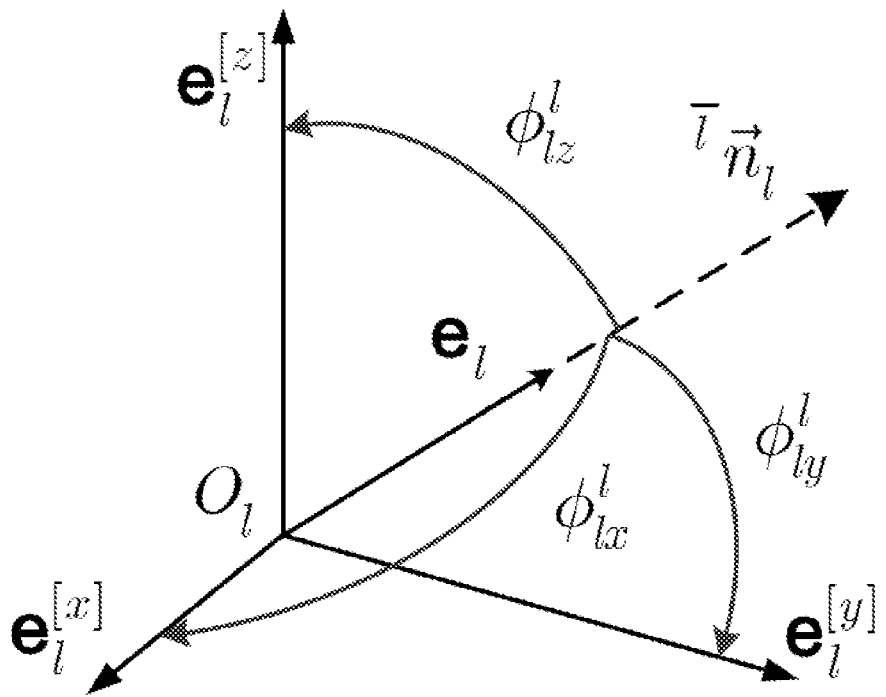
FIG. 14 is a relation diagram of base vector and pedestal.
Figure 15:
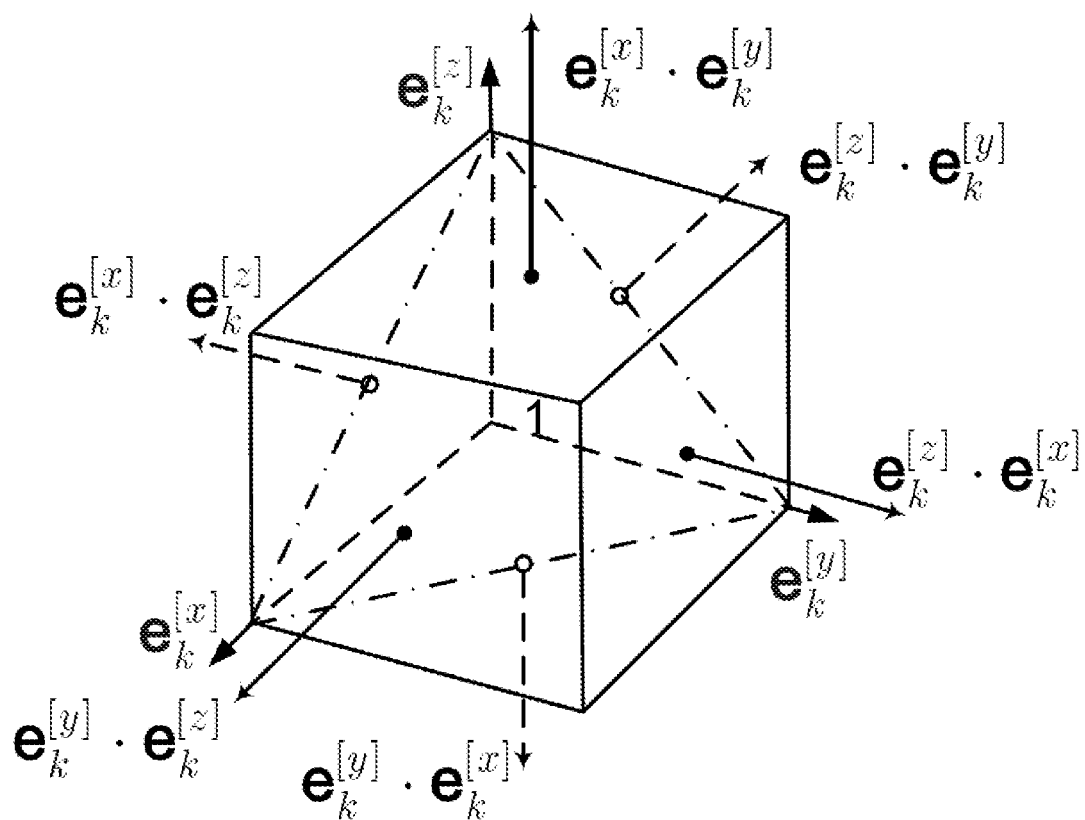
FIG. 15 is a basic components diagram of three-dimensional second-order tensors.
Figure 16:
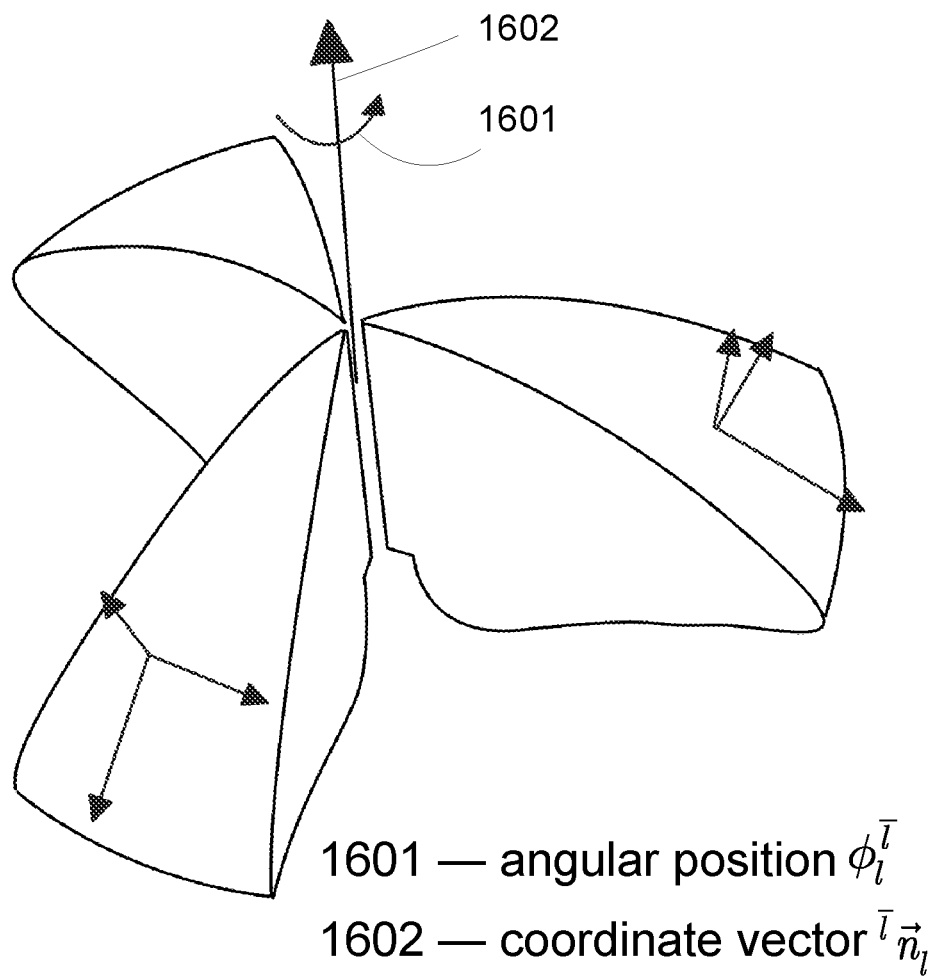
FIG. 16 is a diagram of natural coordinate system and Axis-Invariants.
Figure 17:
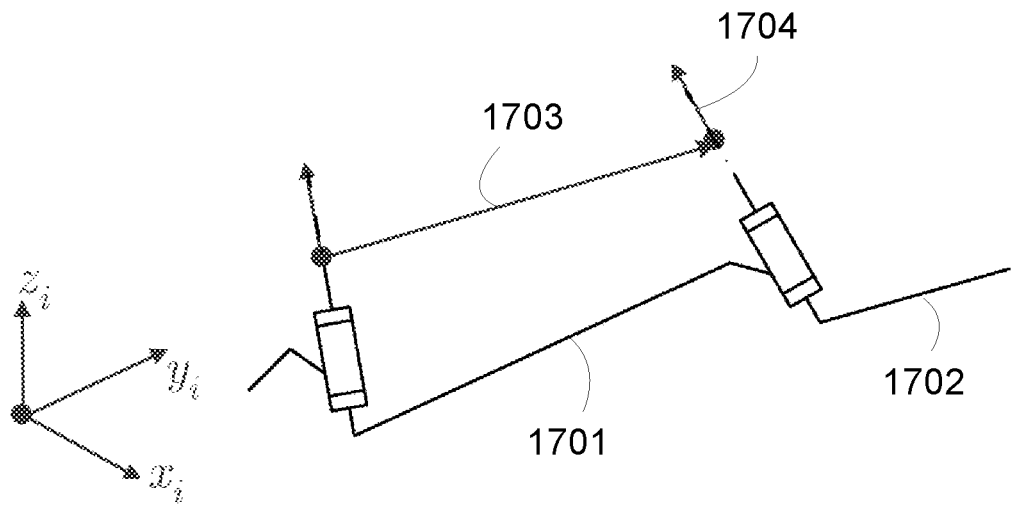
FIG. 17 is a diagram of fixed Axis-Invariants.
Figure 18:
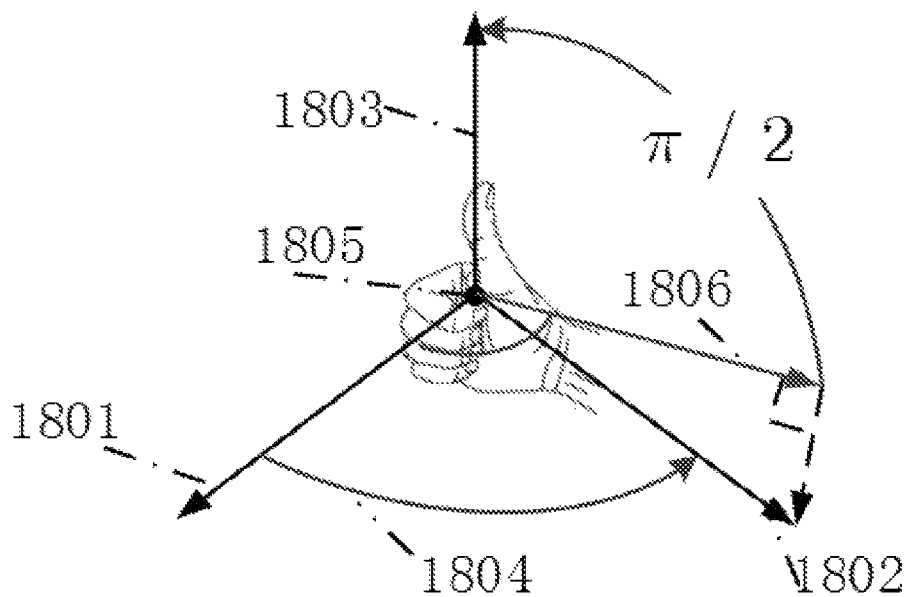
FIG. 18 is a rotation diagram determined by dual vectors.
Figure 19:
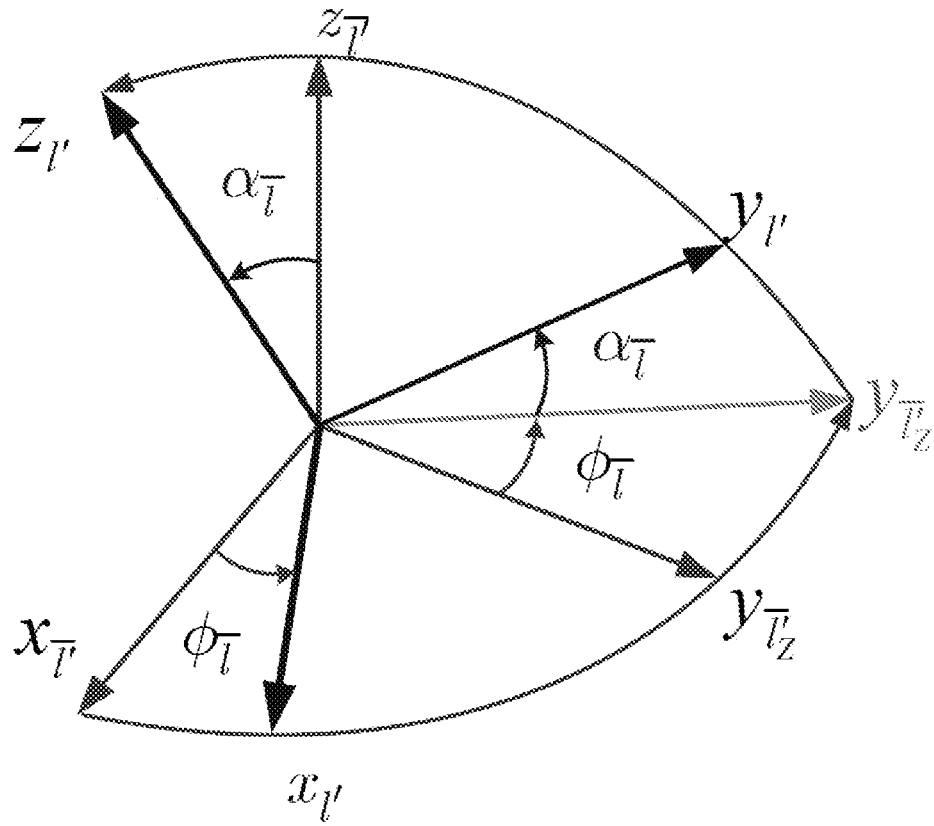
FIG. 19 is a D-H rotation diagram.
Figure 20:
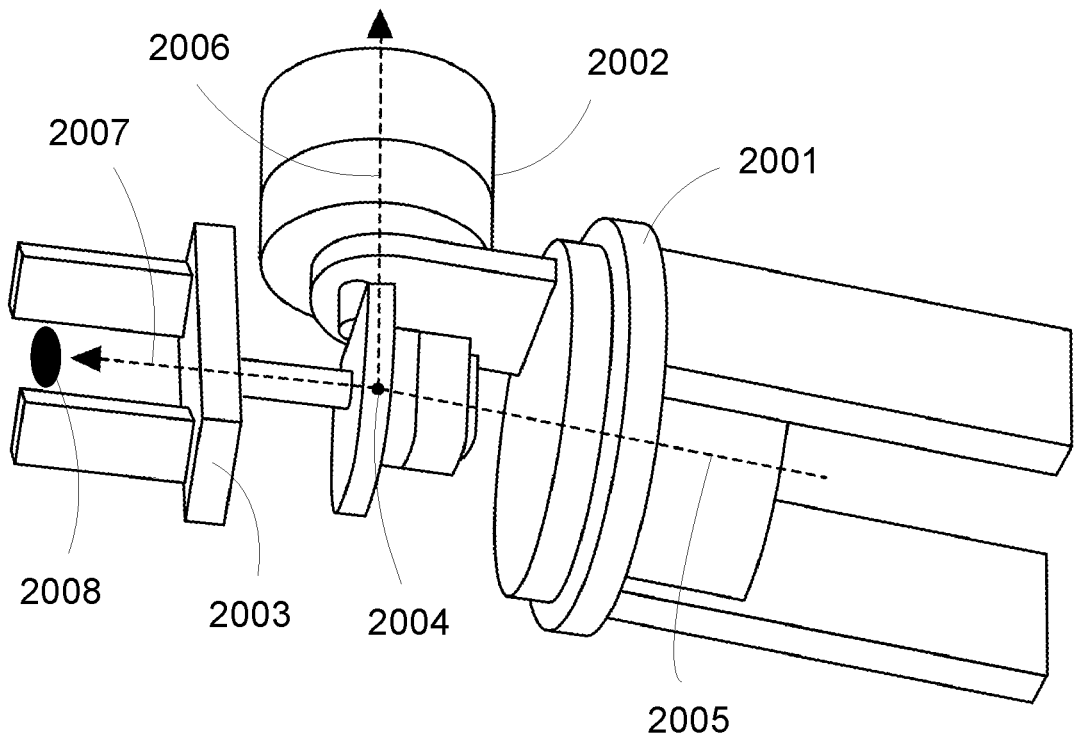
FIG. 20 is a structure diagram of the decoupled robotic arm.
Figure 21A:
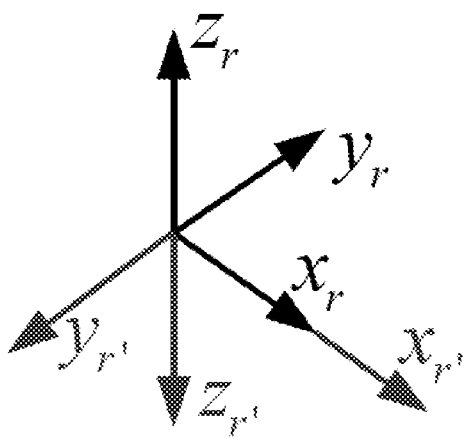
FIG. 21a, 21b are relation diagrams of two sets of coordinate systems.
Figure 21B:
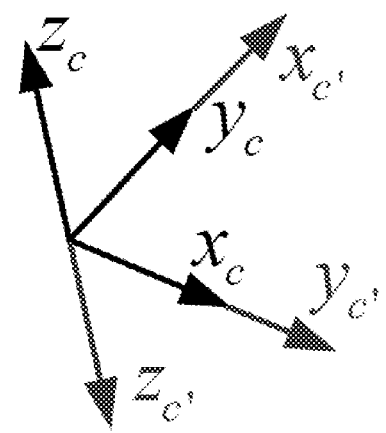
Figure 23:
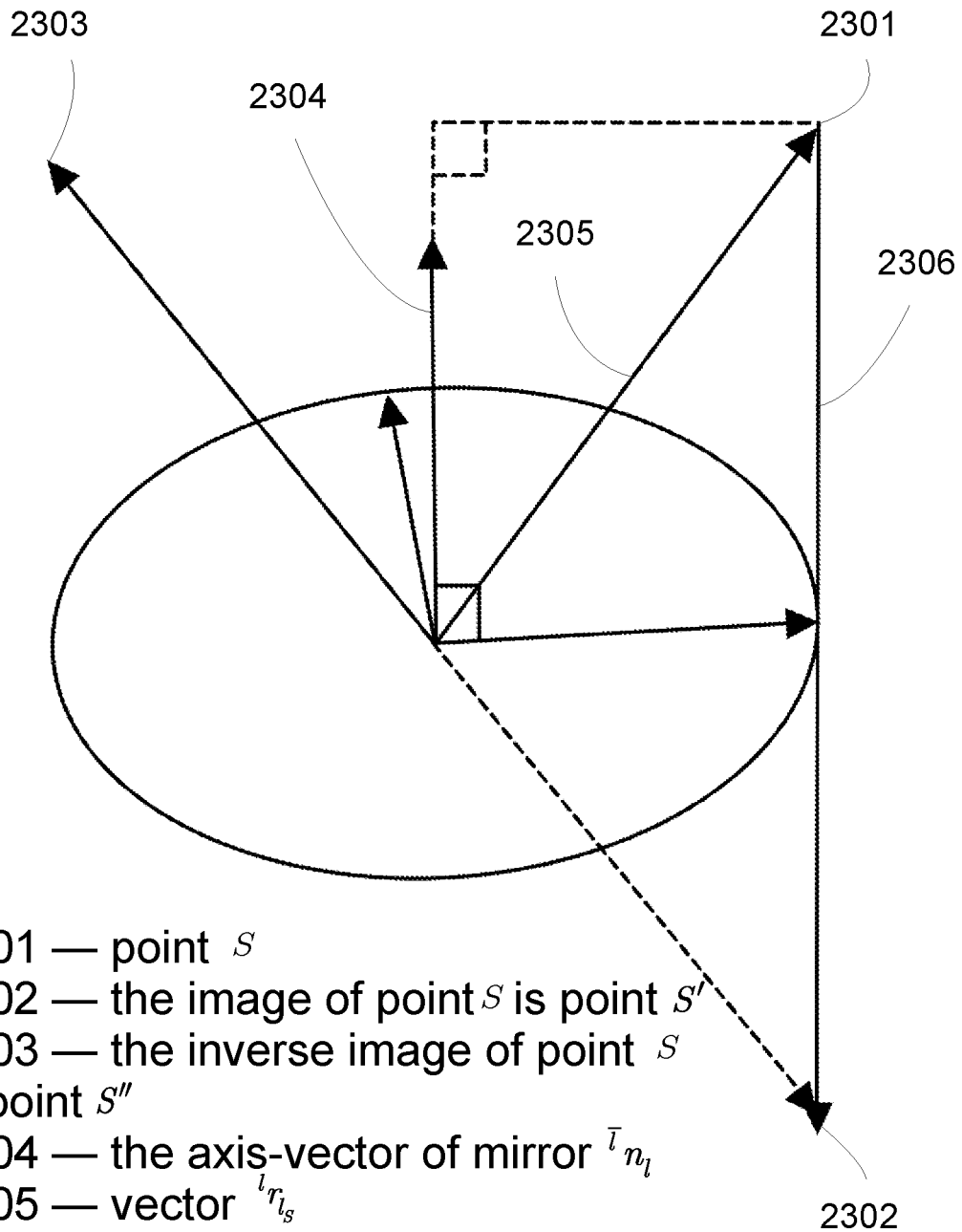
FIG. 23 is a diagram of vector mirroring transformation.
Figure 24:
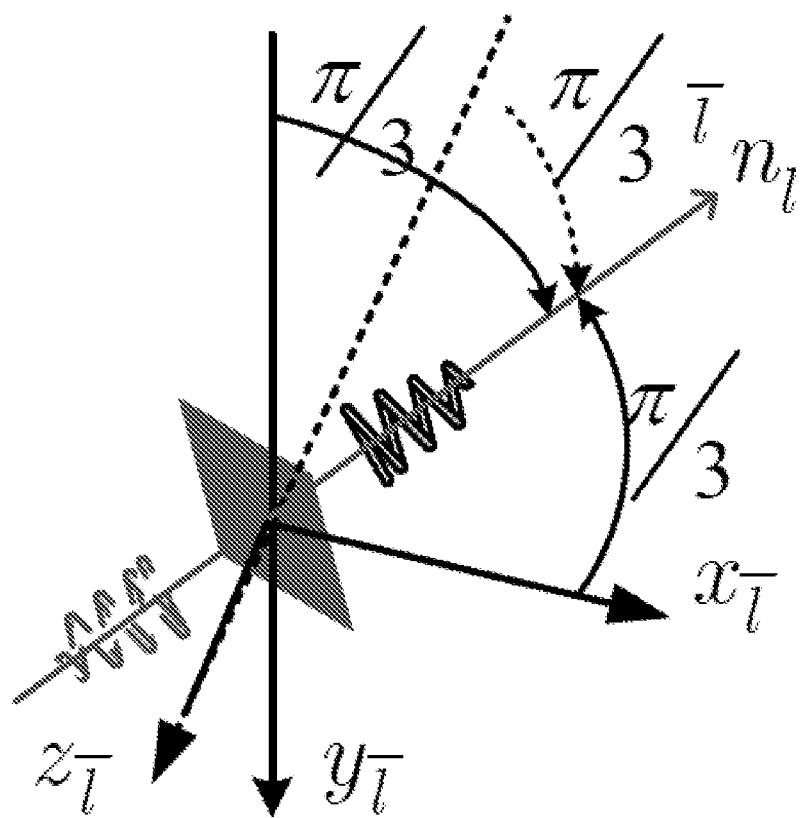
FIG. 24 is a orthophoto map.
Figure 26:
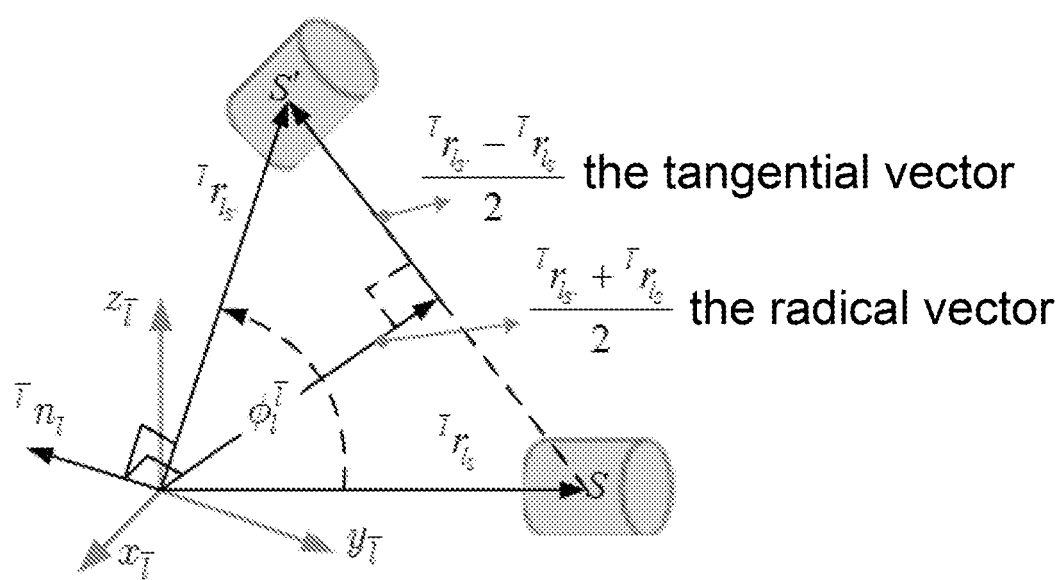
FIG. 26 is a meaning diagram of the Cayley parameter.
Figure 27:
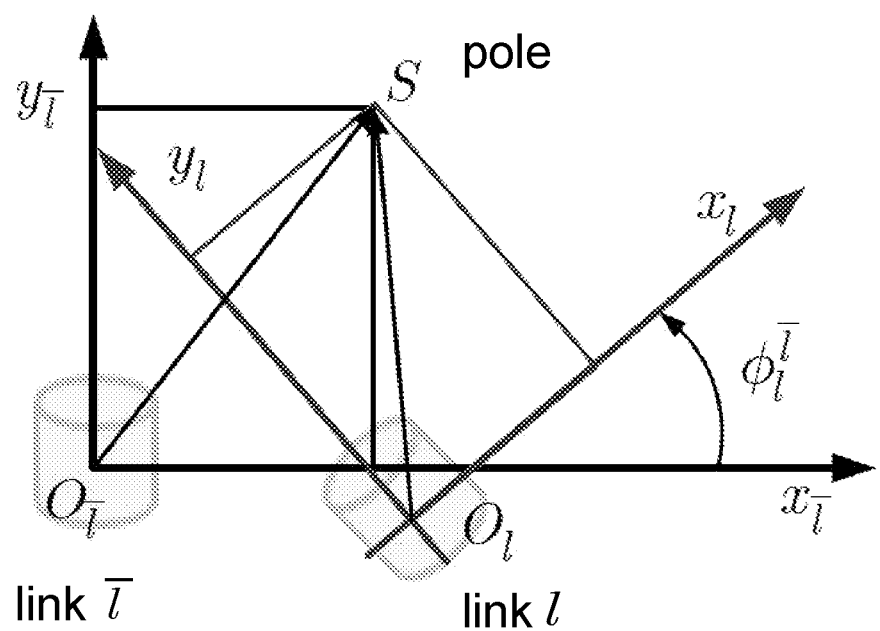
FIG. 27 is a diagram of two-dimensional space pole.
Figure 28:
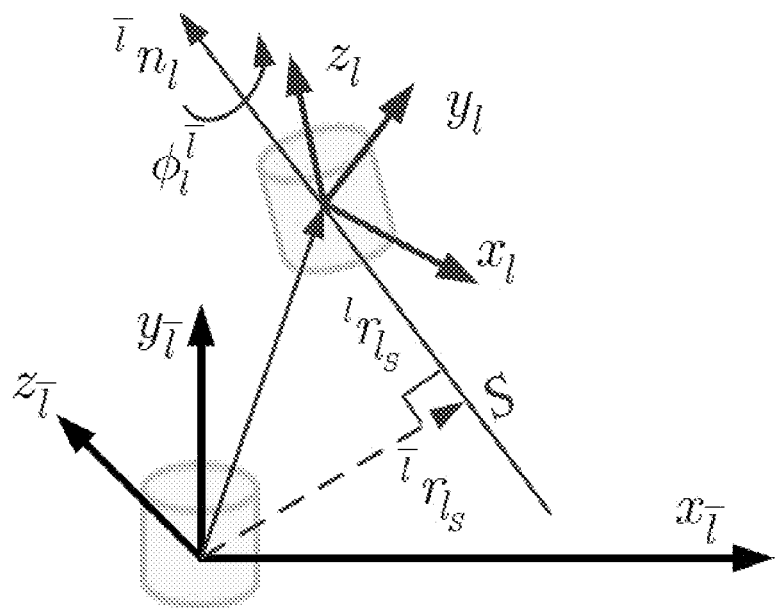
FIG. 28 is a diagram of sports spiral.
Figure 30:
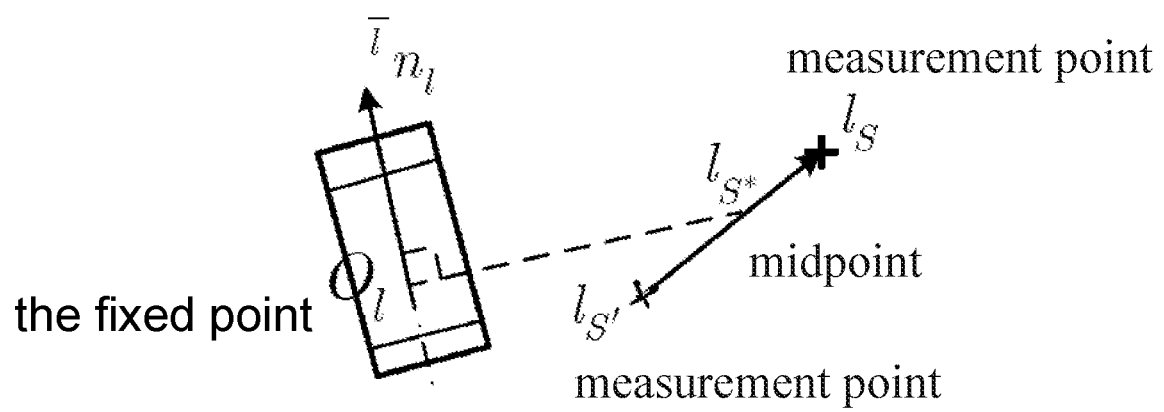
FIG. 30 is an origin determination diagram of fixed Axis-Invariant.
Figure 31:
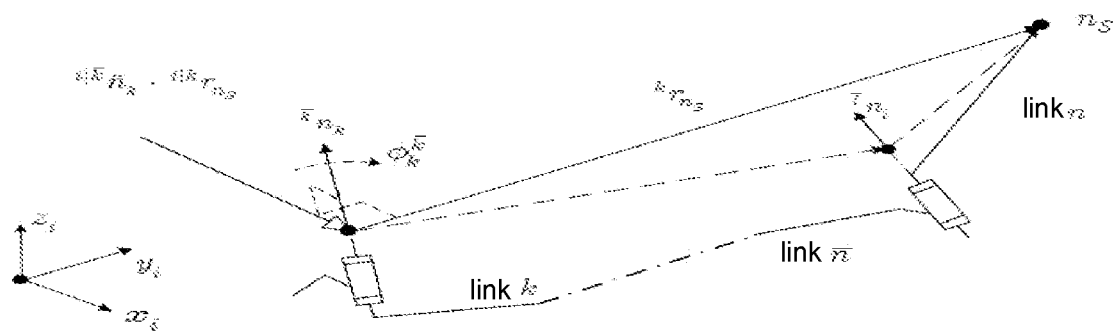
FIG. 31 is a meaning diagram of the partial velocity.
Figure 32:
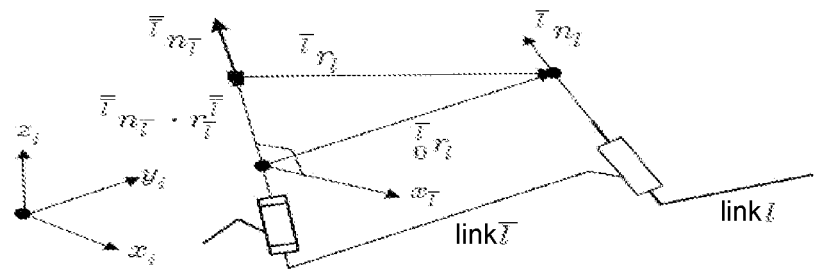
FIG. 32 is a relation diagram of fixed Axis-Invariants and dual quaternions.
Figure 33:
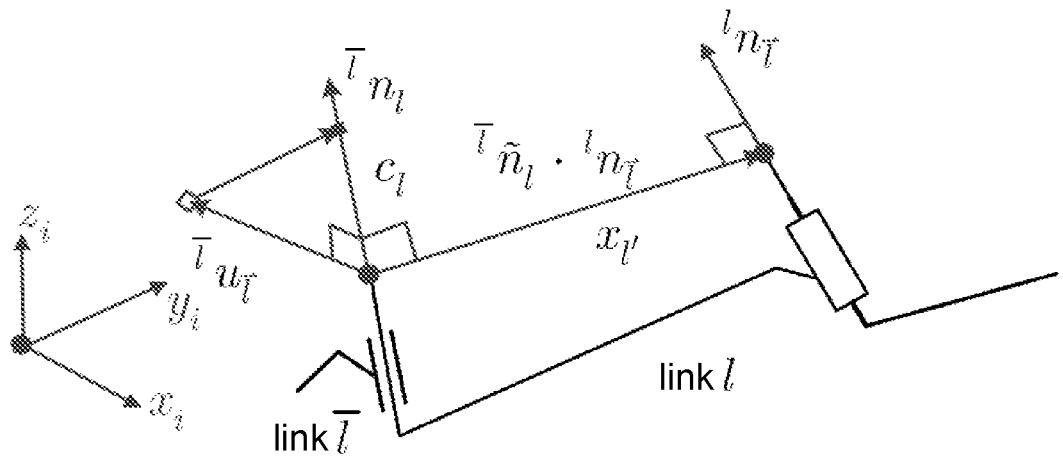
FIG. 33 is a diagram of spiral radial invariant.
Figure 34:
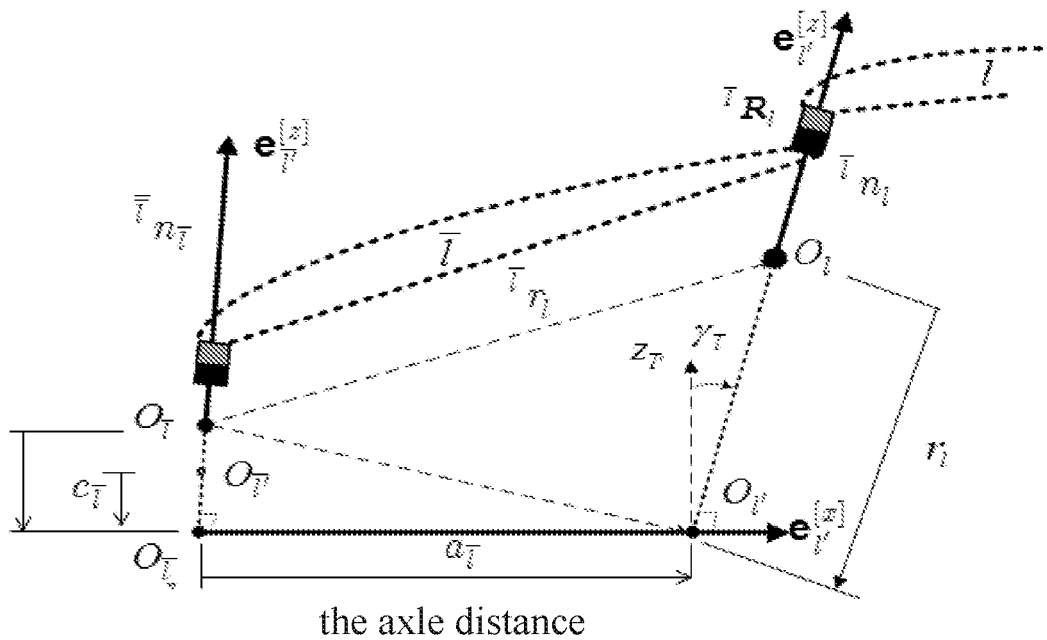
FIG. 34 is a relation diagram of natural coordinate system and D-H system.
Figure 35:
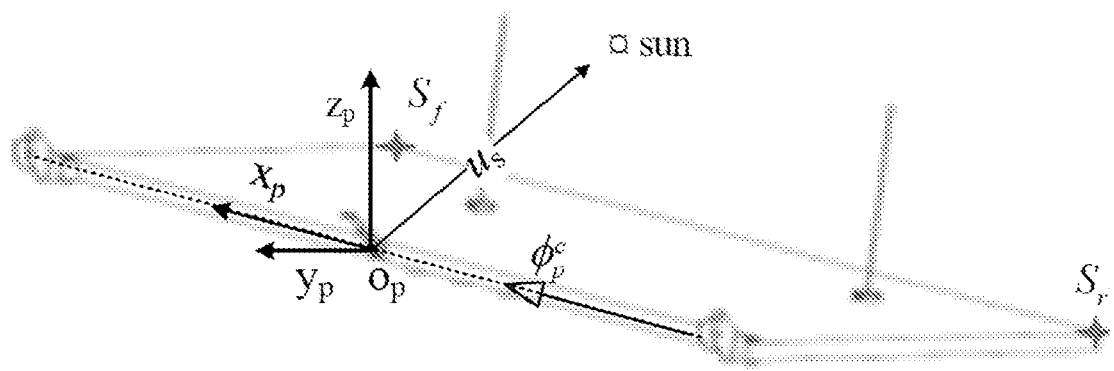
FIG. 35 is a schematic of Lunar rover solar wing coordinate system.
Figure 36:
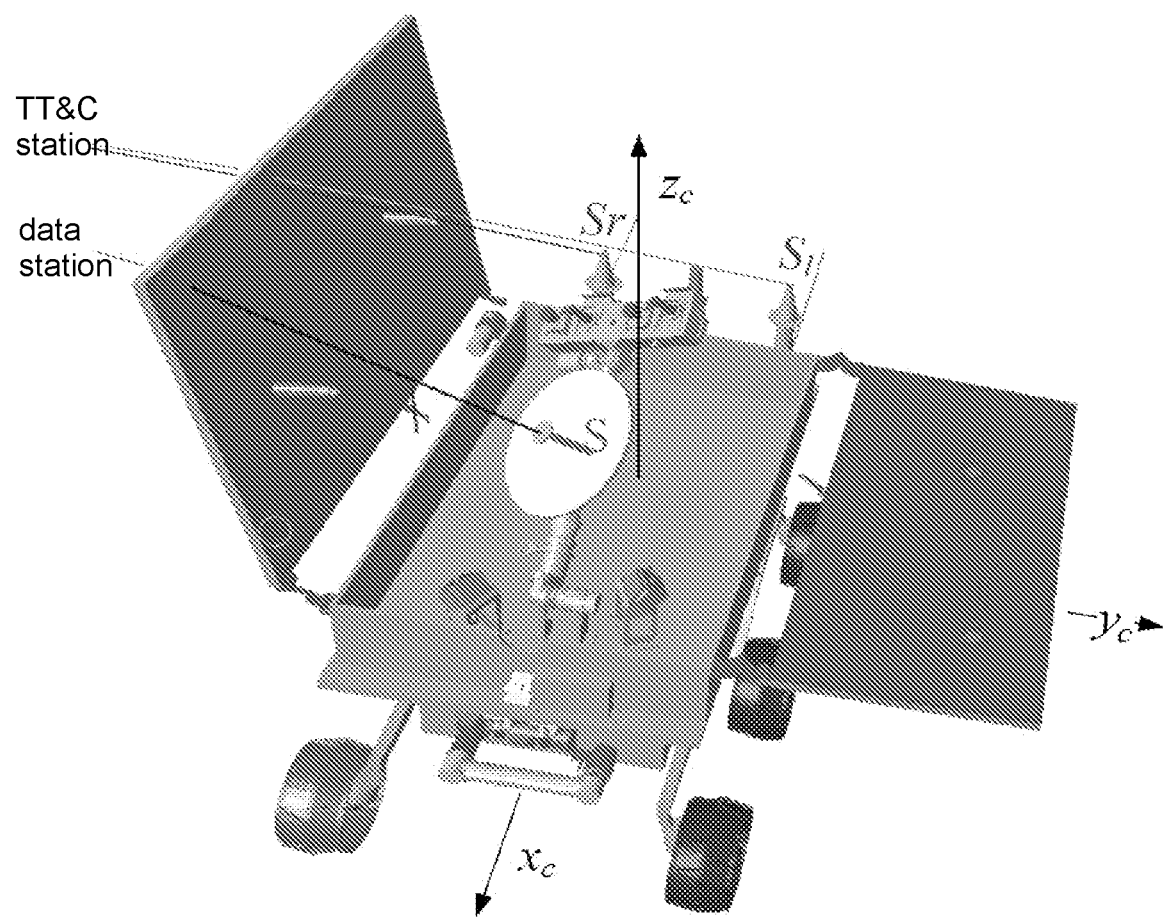
FIG. 36 is an interference diagram between omnidirectional antenna and right-wing, omnidirectional antenna and solar wing.
Figure 37:
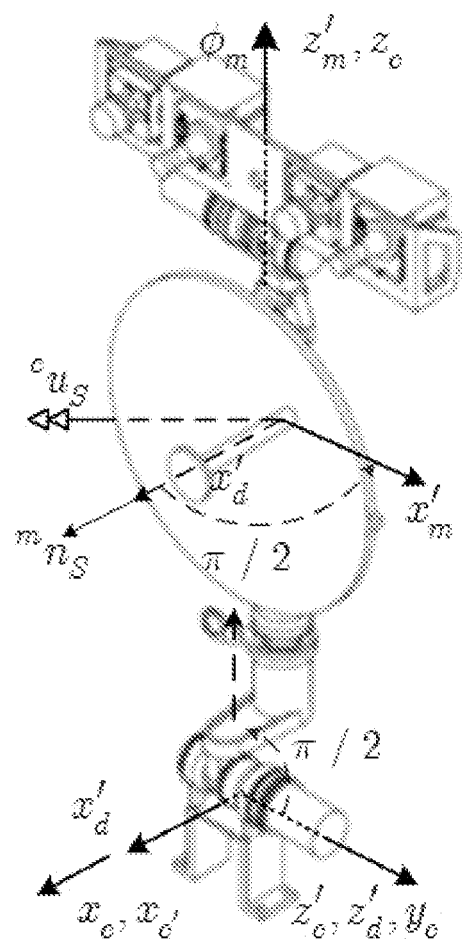
FIG. 37 is a schematic of Lunar rover 2 DOF mast.
Figure 38:
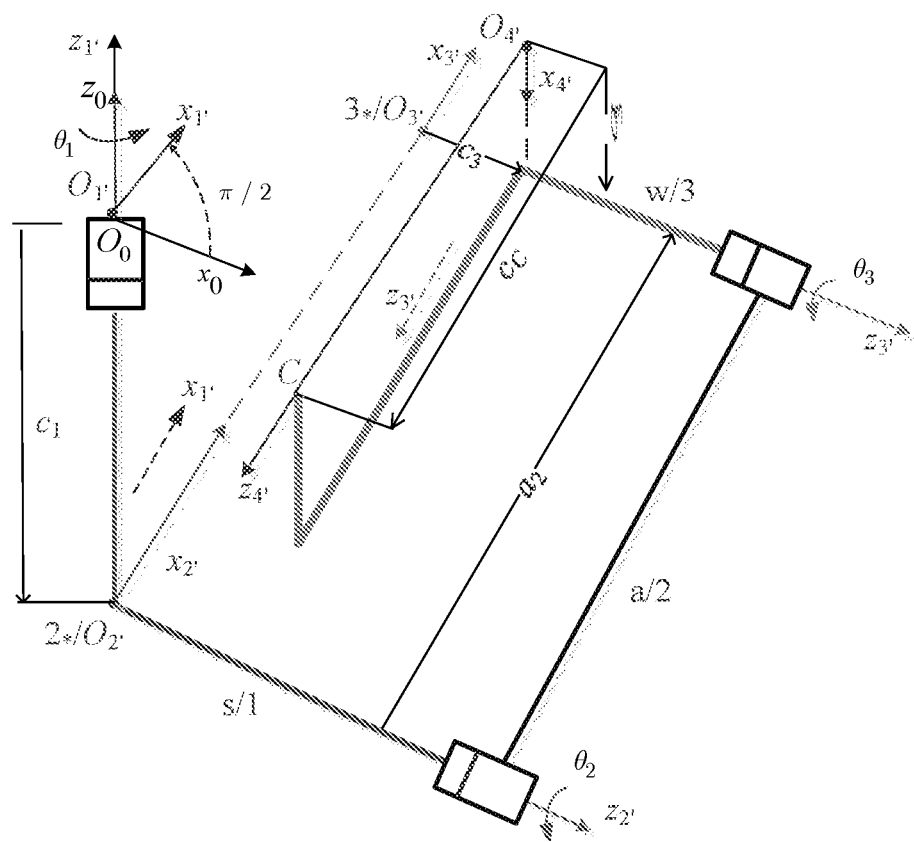
FIG. 38 is a D-H system diagram of the CE3 Lunar rover robotic arm.
Figure 39:
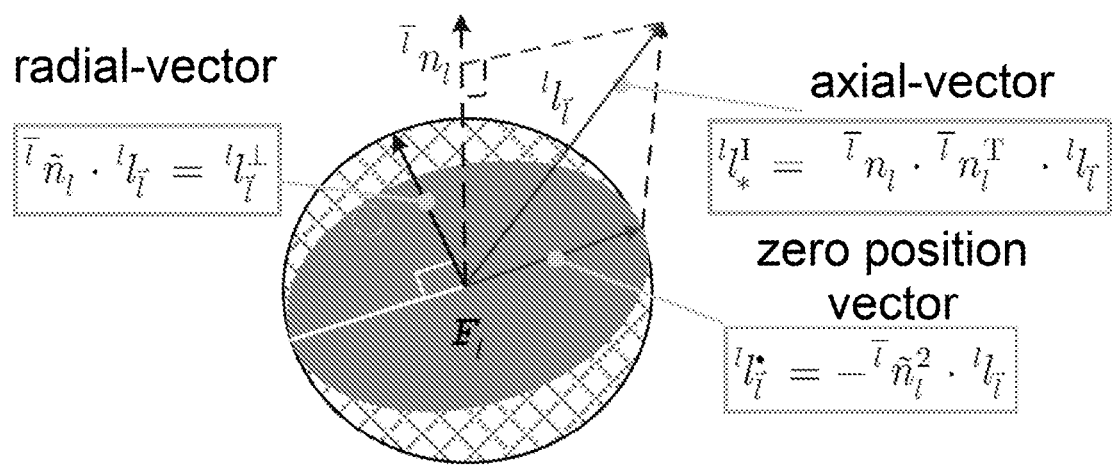
FIG. 39 is a diagram derived invariants of Axis-Invariants.
Figure 40:
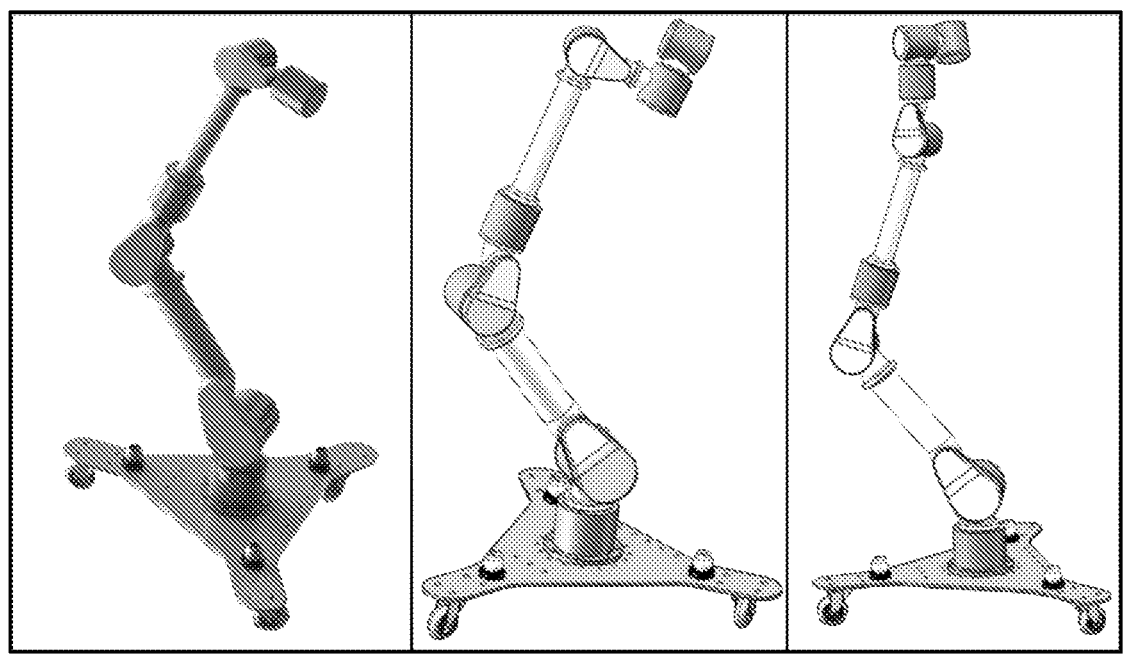
FIG. 40 is a diagram of a high-precision universal robotic arm (left 6R, middle 7R, right 8R).
Figure 41:
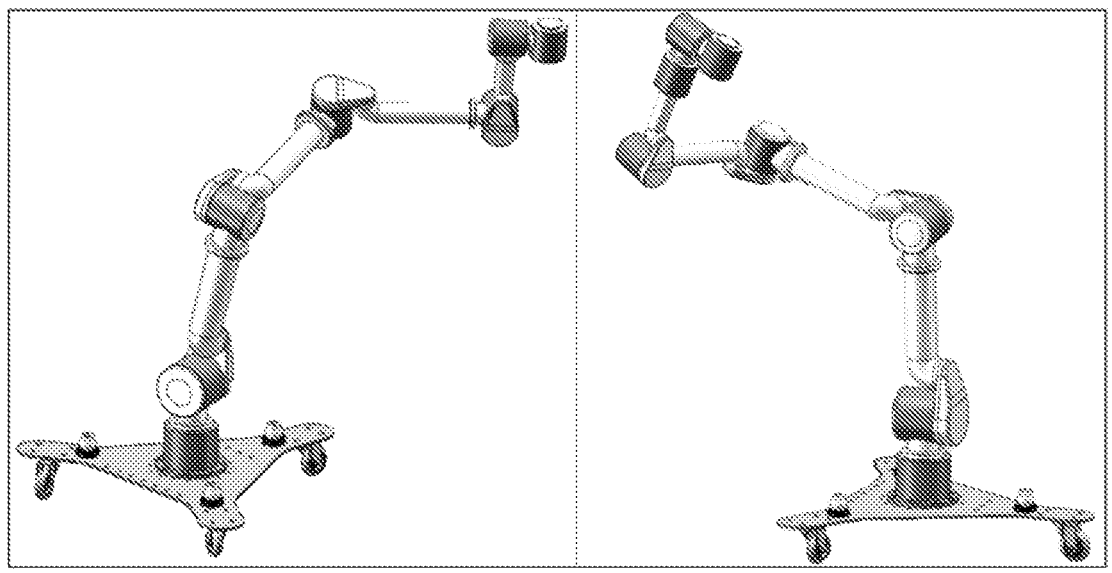
FIG. 41 is a diagram of a human-like arm (left 7R, right 8R).
Figure 42:
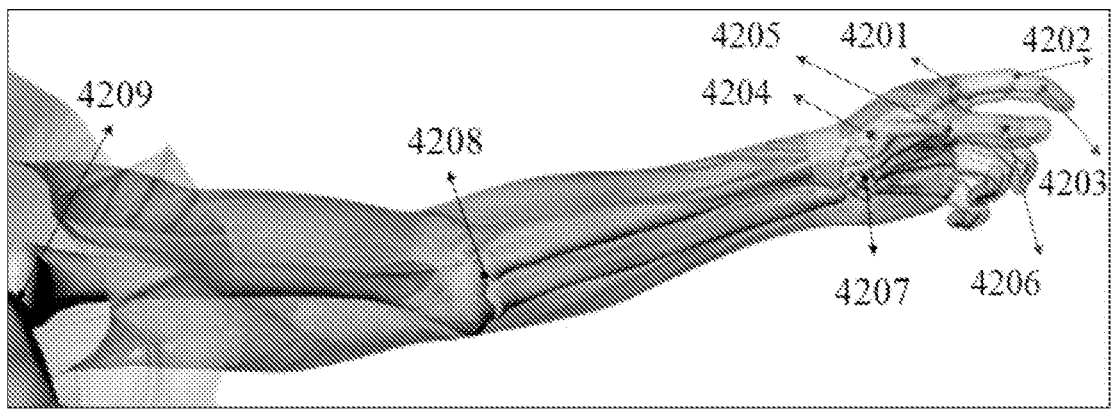
FIG. 42 is a diagram of the human arm structure.
Figure 43:
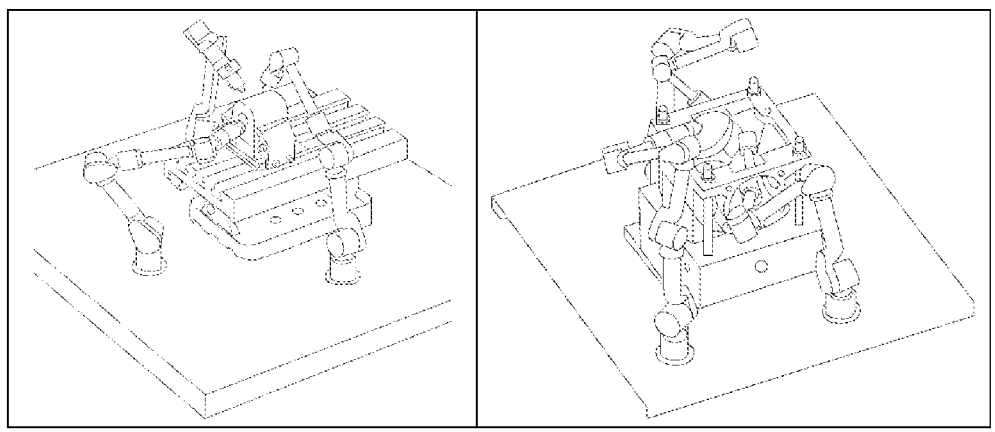
FIG. 43 is robot flexible machining center (left 6R3F, right 6R4F).
Figure 44:
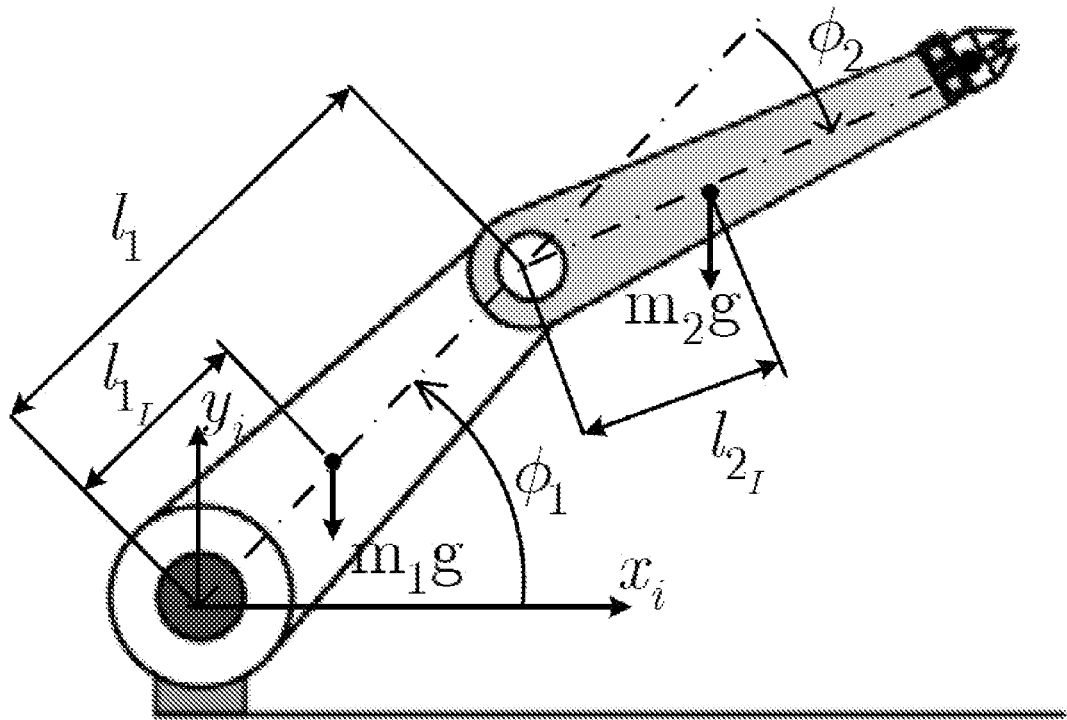
FIG. 44 is a schematic of planar 2R robotic arm.
Figure 45:
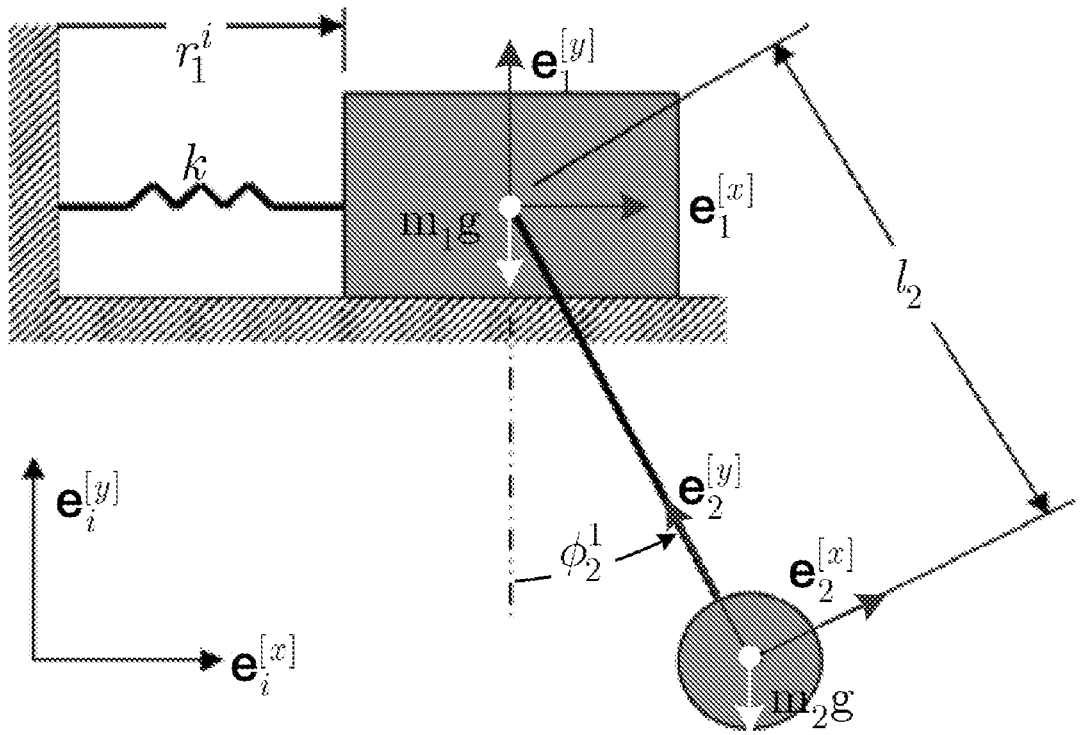
FIG. 45 is a diagram of the ideal spring mass pendulum.
Figure 46:
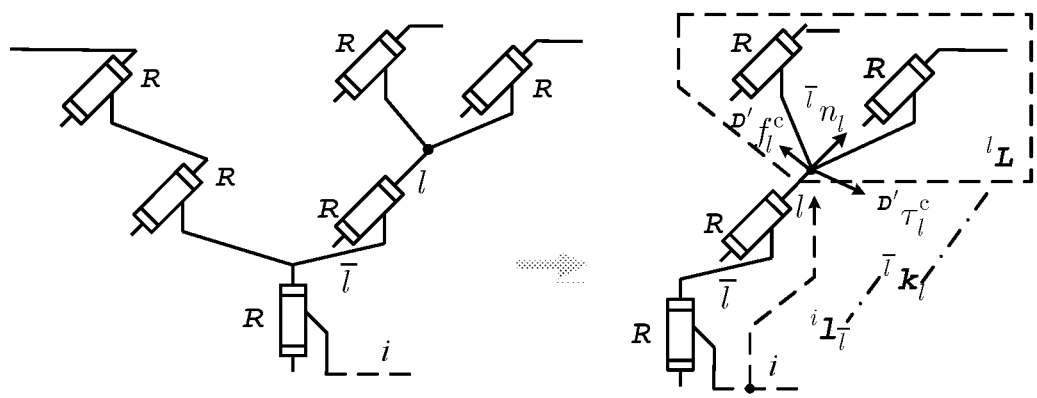
FIG. 46 is a diagram of closed subtree of multi-axis system.
Figure 47:
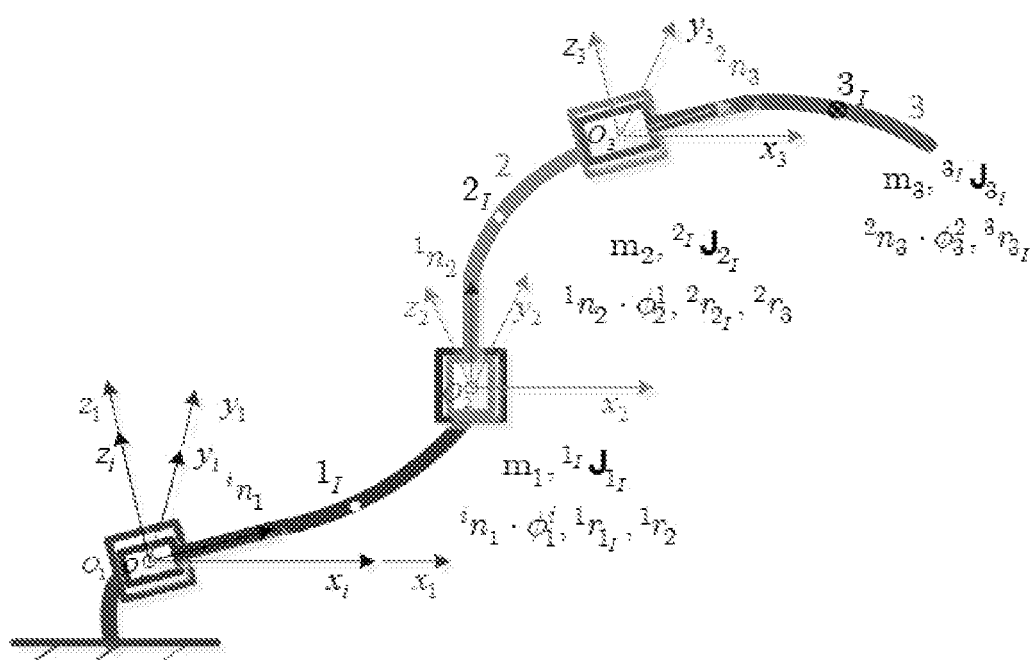
FIG. 47 is a schematic of a generic 3R robotic arm.
Figure 48:
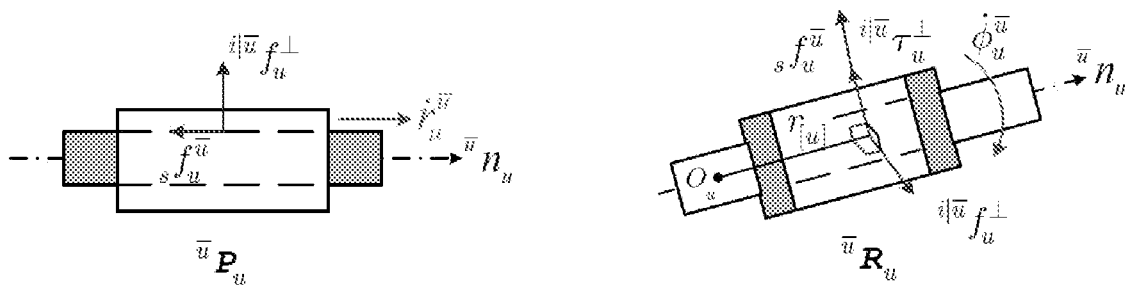
FIG. 48 is a schematic of internal friction and viscous force.
Figure 49:
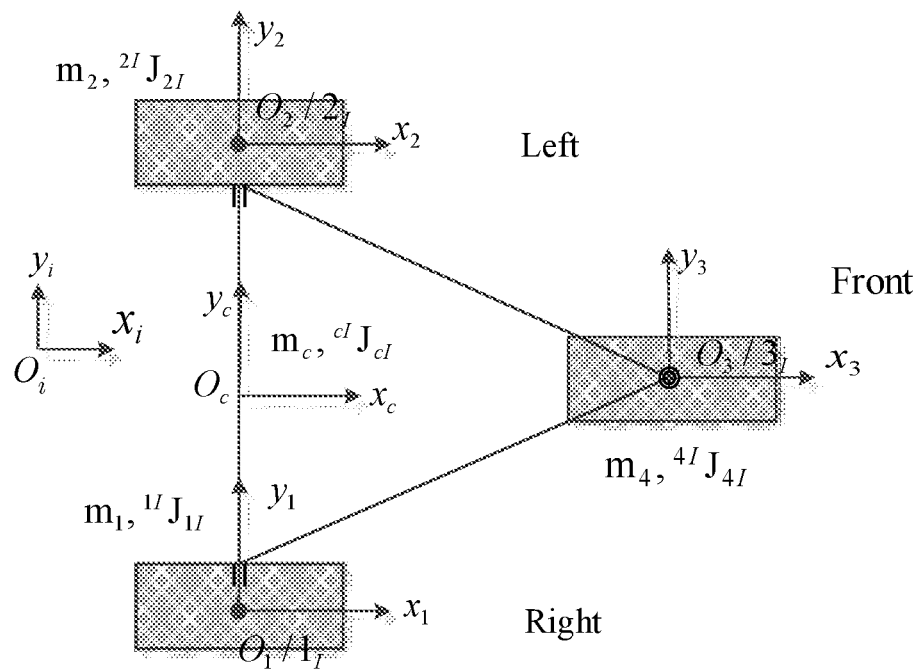
FIG. 49 is a diagram of three-wheeled mobile system.
Figure 50:
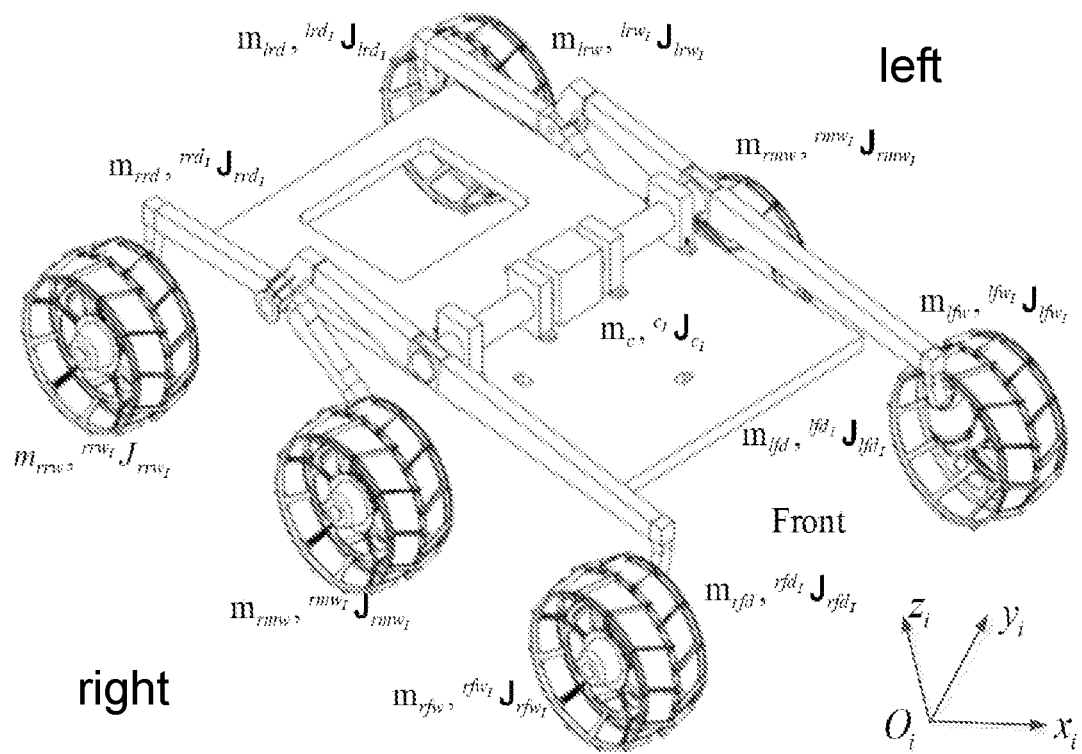
FIG. 50 is a diagram of the CE3 Lunar rover mobile system.
Figure 51:
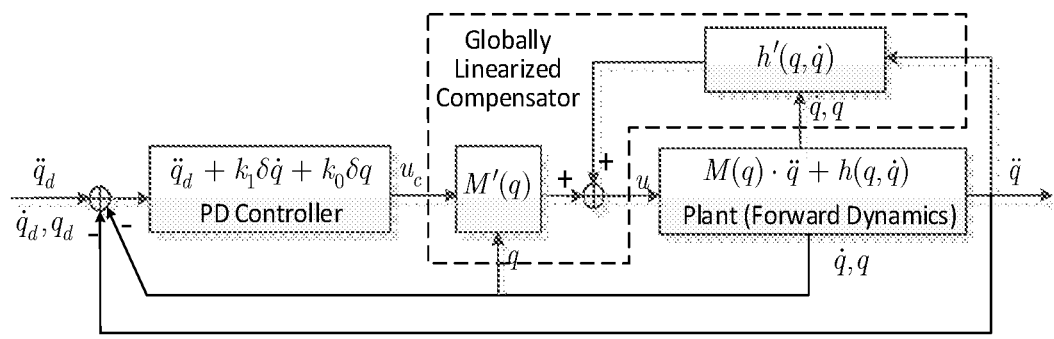
FIG. 51 is a multi-axis system tracking control diagram based on linearizer.
Figure 52:
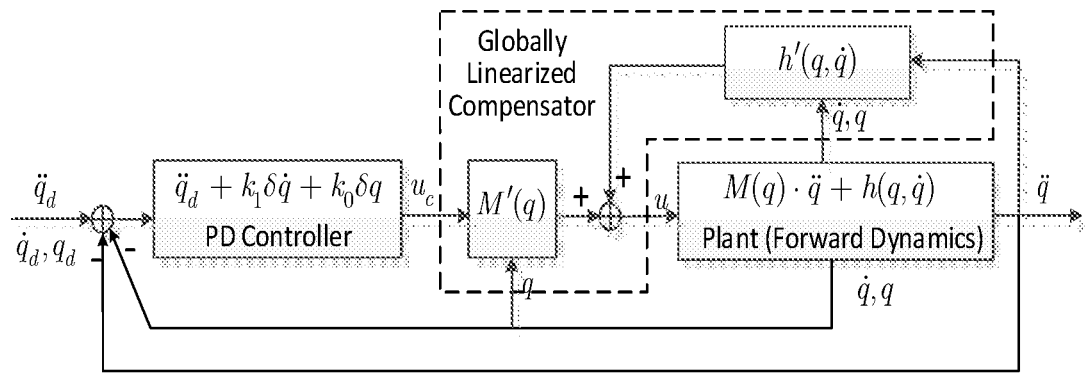
FIG. 52 is a multi-axis system force position control diagram based on the inverse model compensation.
Figure 54:
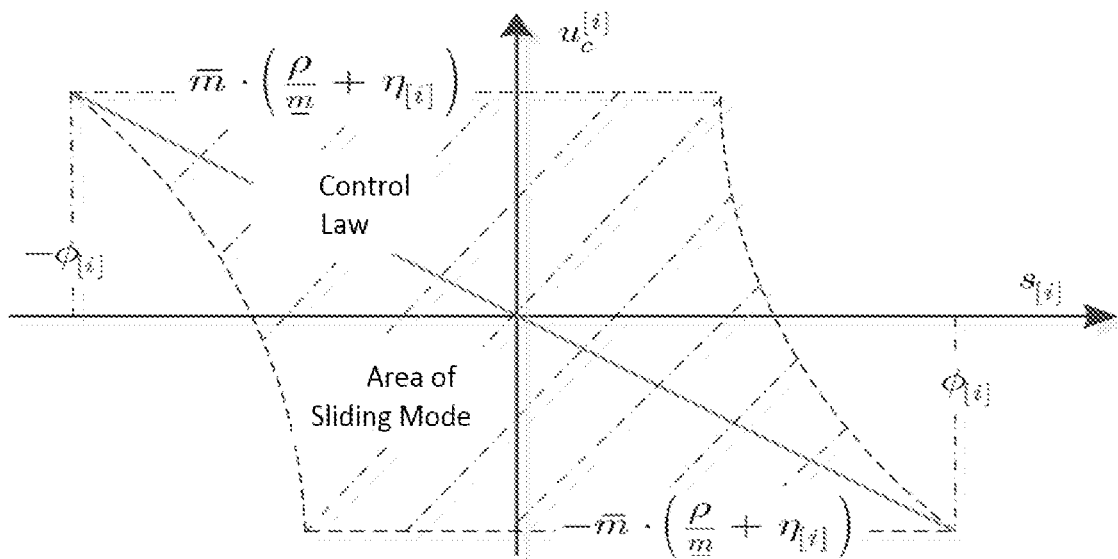
FIG. 54 is a diagram of fuzzy variable structure control law.

What is claimed is:

1. An axis-invariant based multi-axis robot kinematics modeling and solving method, where a multi-axis robot device includes a link set and a joint set, and links in the link set are combined with joints in the joint set; this axis-invariant based multi-axis robot kinematics modeling and solving method includes:
   converting the joint set to a corresponding link set, where one joint in the joint set corresponds to a subaxes set of an axes set and an axis of the axis set is a translational axis or a rotational axis;
   using the axes set to describe the multi-axis robot device correspondingly; establishing a kinetic equation using the axes set; solving an unknown quantity in the kinetic equation by substituting a known quantity to solve mechanical problems encountered in controlling this multi-axis robot device;
   the kinetic equation being as follows: given a multi-axis rigid body system $D=\{A,K,T,NT,F,B\}$, an inertial system is denoted as $F^{[i]}$, $\forall k, \mu \in A$, $NT=\emptyset$; in addition to gravity, an external force and torque acting on an axis l being recorded as $^{i|D}f_u$ and $^{i|D}\tau_u$, respectively; a mass and a centroid torque of inertia of the axis l being denoted as $m_k$ and $^{k|I}J_{k_I}$ respectively; a gravity acceleration of the axis l being $^ig_{l_I}$; a Ju-Kane kinetic preparation equation for an axis u being:

$$\begin{cases} \sum_k^{u_L} \left( m_k \cdot \frac{\partial^i r_{k_I}^T}{\partial r_u^{\overline{u}}} \cdot ^i\ddot{r}_{k_I} - m_k \cdot \frac{\partial^i r_{k_I}^T}{\partial r_k^{\overline{i}}} \cdot ^ig_{k_I} \right) = {^{i|\overline{u}}n_u^T} \cdot {^{i|D}f_u} & \text{if } {^{\overline{u}}k_u} \in P \\ \sum_k^{u_L} \left( m_k \cdot \frac{\partial^i r_{k_I}^T}{\partial \phi_u^{\overline{u}}} \cdot ^i\ddot{r}_{k_I} + \frac{\partial^i \dot{\phi}_k^T}{\partial \phi_u^{\overline{u}}} \cdot \begin{pmatrix} ^{i|k_I}J_{k_I} \cdot {^i\ddot{\phi}_k} + \\ ^i\dot{\phi}_k \cdot {^{i|k_I}J_{k_I}} \cdot {^i\dot{\phi}_k} \end{pmatrix} \right) - & \text{if } {^{\overline{u}}k_u} \in R \\ m_k \cdot \frac{\partial^i r_{k_I}^T}{\partial \phi_u^{\overline{u}}} \cdot ^ig_{k_I} \Bigg) = {^{i|\overline{u}}n_u^T} \cdot {^{i|D}\tau_u} \end{cases}$$

wherein, $k_I$ indicates a link k's centroid I; a mass and a centroid torque of inertia of an axis k are recorded as $m_k$ and $^{k|I}J_{k_I}$ respectively; $^i\dot{\phi}_k$ is a rotational velocity vector; $^i\ddot{\phi}_k$ is a rotational acceleration vector; $^i\dot{r}_{k_I}$ is a translational acceleration vector; $^i\dot{r}_{k_I}$ is a translational velocity vector; $r_u^{\overline{u}}$ is a translational joint coordinate; $\dot{r}_u^{\overline{u}}$ is a translational joint velocity; $\phi_u^{\overline{u}}$ is a rotational joint coordinate; $\dot{\phi}_u^{\overline{u}}$ is a rotational joint velocity; generalized forces in closed subtree $u_L$ have additivity, nodes of a closed subtree have a kinematic chain to a root, and a kinematic chain $^il_n$ can be replaced by a kinematic chain $u_L$.

2. The axis-invariant based multi-axis robot kinematics modeling and solving method according to claim 1, wherein a mechanical equation is a dynamic equation of the axis u, which is based on a natural coordinate system and has a kinematic chain index system.

3. The axis-invariant based multi-axis robot kinematics modeling and solving method according to claim 2, wherein when the multi-axis rigid body system $D=\{A,K,T,NT,F,B\}$ is given, that is, given a system topology, a natural reference axis polarity, structural parameters and dynamic parameters, then a dynamics modeling can be completed by substituting into the dynamic equations.

4. The axis-invariant based multi-axis robot kinematics modeling and solving method according to claim 2, wherein in the dynamic equation, natural coordinates are joint coordinates $\phi_u^{\overline{u}}$ or $r_u^{\overline{u}}$ and $\forall \mu \in A$.

5. The axis-invariant based multi-axis robot kinematics modeling and solving method according to claim 2, wherein in the dynamic equation, a reference point is origin $O_k$ of a natural coordinate system $F^{[k]}$ instead of a centroid $k_I$, wherein $\forall k \in A$.

6. The axis-invariant based multi-axis robot kinematics modeling and solving method according to claim 1, wherein a reference direction in the kinetic equation is a natural reference axis or an axis invariant $^{\overline{u}}n_u$, wherein $u \neq i$, $\mu \in A$.

7. The axis-invariant based multi-axis robot kinematics modeling and solving method according to claim 1, wherein the kinetic equation is based on a construction of an axis chain system, when the axis k and a dynamic body $B^{[k]}$ are consolidated, $m_u \neq 0$ and $^{k|I}J_{k_I} \neq 0$; a mass and an inertia of other axes are zero; and in a software implementation, a zero mass axis is skipped.

8. The axis-invariant based multi-axis robot kinematics modeling and solving method according to claim 1 also being a hardware design and analysis method for a multi-axis robot system, which is used to optimize a structure of the multi-axis robot system and improve an absolute positional accuracy and a dynamic performance of the multi-axis robot system.

9. The axis-invariant based multi-axis robot kinematics modeling and solving method according to claim 1 also being a software design and software engineering implementation method of a multi-axis robot system, which has a pseudo code function and a software implemented debugging function.

10. The axis-invariant based multi-axis robot kinematics modeling and solving method according to claim 1 also being a method for autonomously performing kinematics and dynamic symbol modeling of multi-axis systems, and having functions and processes of symbolic analysis and symbolic computation for multi-axis systems.

11. A modeling and solving method for controlling a multi-axis robot device, wherein a multi-axis robot device includes a link set and a joint set, and links in the link set are combined with joints in the joint set; this modeling and solving method includes:
    converting the joint set to a corresponding link set, where one joint in the joint set corresponds to a subaxes set of an axes set and an axis of the axis set is a translational axis or a rotational axis;
    using the axes set to describe the multi-axis robot device correspondingly; establishing a kinetic equations by using the axes set; solving an unknown quantity in this kinetic equation by substituting a known quantity to solve mechanical problems encountered in controlling this multi-axis robot device; the kinetic equation being as follows: given a multi-axis rigid body system D={A, K,T,NT,F,B} an inertial system is denoted by $F^{[i]}$, $\forall k$, $\mu \in A$, NT=∅; in addition to gravity, an external force acting on an axis l and a torque on $^{\bar{u}}n_u$ are recorded as $^{i|D}f_u$ and $^{i|D}\tau_u$, respectively; a mass and a centroid torque of inertia of the axis l are denoted as $m_k$ and $^{k_I}J_{k_I}$ respectively; a gravity acceleration of the axis l being $^i g_{l_I}$; a bilateral driving force of a drive axis u and components of a driving torque at $^{\bar{u}}n_u$ are recorded as $f_u^c(\dot{r}_l^{\vec{I}})$ and $\tau_u^c(\dot{\phi}_l^{\vec{I}})$, respectively; a force and an acting torque of an environment i to the axis l being $^{is}f_{l_S}$ and $^i\tau_l$ respectively; the tree chain dynamics equation for an axis u being:

$$\begin{cases} ^{i|\bar{u}}n_u^T \cdot M_P^{[u][\bullet]} \cdot \ddot{q} + ^{i|\bar{u}}n_u^T \cdot h_P^{[u]} = f_u^D, & \text{if } ^{\bar{u}}k_u \in P \\ ^{i|\bar{u}}n_u^T \cdot M_R^{[u][\bullet]} \cdot \ddot{q} + ^{i|\bar{u}}n_u^T \cdot h_R^{[u]} = \tau_u^D, & \text{if } ^{\bar{u}}k_u \in R \end{cases};$$

wherein: $M_P^{[u][v]}$ and $M_R^{[u][v]}$ are a 3×3 block matrix, $h_P^{[u]}$ and $h_R^{[u]}$ are 3D vectors, and have:

$$\ddot{q} \triangleq \left\{ ^{i|l}\ddot{q}_l = ^{i|l}n_l \cdot \ddot{q}_l^{\vec{I}} \middle| \begin{array}{l} \ddot{q}_l^{\vec{I}} = \ddot{r}_l^{\vec{I}}, \text{if } ^l k_l \in P; \\ \ddot{q}_l^{\vec{I}} = \ddot{\phi}_l^{\vec{I}}, \text{if } ^l k_l \in R; \end{array} l \in A \right\},$$

$$M_P^{[u][\bullet]} \cdot \ddot{q} \triangleq \sum_k^{^uL} \left( m_k \cdot \sum_l^{^i l_{k_I}} (^i\ddot{\phi}_l \cdot ^{il}r_l + ^{il}\ddot{r}_l) \right),$$

$$M_R^{[u][\bullet]} \cdot \ddot{q} \triangleq \sum_k^{^uL} \left( ^{i|k_I}J_{k_I} \cdot ^{i\ddot{\phi}}_k + m_k \cdot ^{i|\bar{u}}\tilde{r}_{k_I} \cdot \sum_l^{^i l_{k_I}} (^i\ddot{\phi}_l \cdot ^{il}r_l + ^{il}\ddot{r}_l) \right),$$

$$h_P^{[u]} \triangleq \sum_k^{^uL} \left( m_k \cdot \sum_l^{^i l_{k_I}} (^i\dot{\phi}_l^{:2} \cdot ^{il}r_l + 2 \cdot ^i\dot{\phi}_l \cdot ^{il}\dot{r}_l) \right) - \sum_k^{^uL} (m_k \cdot ^i g_{k_I}),$$

$$h_R^{[u]} \triangleq \sum_k^{^uL} \left( m_k \cdot ^{i|\bar{u}}\tilde{r}_{k_I} \cdot \sum_l^{^i l_{k_I}} (^i\dot{\phi}_l^{:2} \cdot ^{il}r_l + 2 \cdot ^i\dot{\phi}_l \cdot ^{il}\dot{r}_l) \right) +$$

$$\sum_k^{^uL} (^i\dot{\phi}_k \cdot ^{i|k_I}J_{k_I} \cdot ^i\dot{\phi}_k) - \sum_k^{^uL} (m_k \cdot ^{i|\bar{u}}\tilde{r}_{k_I} \cdot ^i g_{k_I}),$$

$$\begin{cases} f_u^D = f_u^c + \ddot{r}_u^{\bar{u}} \cdot G(f_u^c) + ^{i|\bar{u}}n_u^T \cdot \sum_l^{^uL} (^{is}f_{l_s}), & \text{if } ^{\bar{u}}k_u \in P \\ \tau_u^D = \tau_u^c + \ddot{\phi}_u^{\bar{u}} \cdot G(\tau_u^c) + ^{i|\bar{u}}n_u^T \cdot \sum_l^{^uL} (^{i|\bar{u}}\tilde{r}_{l_s} \cdot ^{is}f_{l_s} + ^i\tau_l), & \text{if } ^{\bar{u}}k_u \in R \end{cases};$$

wherein, $k_I$ indicates a link k's centroid I; a mass and a centroid torque of inertia of an axis k are recorded as $m_k$ and $^{k_I}J_{k_I}$, respectively; $M_R^{[u][\cdot]}$ is an inertia matrix of a rotational axis u; $M_P^{[u][\cdot]}$ is an inertia matrix of a translational axis u; $h_R$ is a non-inertia matrix of the rotational axis u; $h_P$ is a non-inertia matrix of the translational axis u; an external force and a torque acting on the axis u at $^{\bar{u}}n_u$ are recorded as $f_u^D$ and $\tau_u^D$, respectively; the bilateral driving force of the drive axis u and the components of the driving torque at $^{\bar{u}}n_u$ are recorded as $f_u^c(\dot{r}_l^{\vec{I}})$ and $\tau_u^c(\dot{\phi}_l^{\vec{I}})$, respectively; the force and the acting torque of the environment i to the axis l are $^{is}f_{l_S}$ and $^i\tau_l$ respectively.

12. The modeling and solving method according to claim 11, wherein symbols in the kinetic equation are written into a code thus making an operation utilizing the code have an iterative structure through code modularization, which ensures the reliability and mechanised calculation of the multi-axis rigid body system.

13. The modeling and solving method according to claim 11, wherein an intrinsically compact dynamic system is constructed by an axis invariant, which wherein the intrinsically compact dynamic system has iterative and 3D generalized inertia based on the axis invariant, an inherently compact level, an ability to avoid the conversion of system interface and user interface, and an ensurement of the real-time performance of dynamic forward and inverse calculations.

14. The modeling and solving method according to claim 11, wherein a coordinate system, a polarity and a complete parameterization of structural parameters are realized through a dynamic equation, wherein the dynamic equation ensures the versatility and functional multiplexing performance of a model and forward and inverse dynamics calculation.

15. The modeling and solving method according to claim 11, further comprising directly applying structural parameters based on a fixed axis invariance obtained by precise measurement of a laser tracker to form an explicit dynamic equation, which ensures the accuracy of modeling and forward and inverse dynamics calculations.

16. The modeling and solving method according to claim 11, wherein a dynamic equation is obtained directly by the modeling and solving method, and there is no need to analyze a modeling process.

17. The modeling and solving method according to claim 11, wherein a closed subtree $^uL$ determines a topological structure associated with the kinetic equation, and a computational complexity is proportional to a system axis number $|^uL|$, so an equation establishment process has linear complexity $O(|^uL|)$.

18. A modeling and solving method for controlling a multi-axis robot device, wherein a multi-axis robot device includes a link set and a joint set, and the links in the link set are combined with joints in the joint set; this modeling and solving method includes:
   converting the joint set to mea corresponding link set, where one joint in the joint set corresponds to a subaxes set of an axes set and an axis of the axis set is a translational axis or a rotational axis;
   using the axes set to describe the multi-axis robot device correspondingly;
   establishing a kinetic equations by using the axes set, and solving an unknown quantity in this kinetic equation by substituting a known quantity to solve mechanical problems encountered in controlling this multi-axis robot device; the kinetic equation being as follows: given a multi-axis rigid body system D={A,K,T,NT,F,B}, an inertial system is denoted as $F^{[i]}$, $\forall k$, $\mu \in A$, NT=∅; in addition to gravity, an external force acting on an axis l and a torque on the $^{\bar{u}}n_u$ are recorded as $^{i|D}f_u$ and $^{i|D}\tau_u$, respectively; a mass and a centroid torque of inertia of the axis l are denoted as $m_k$ and $^{k_I}J_{k_I}$, respectively; a gravity acceleration of the axis l being $^i g_{l_I}$; a bilateral driving force of a drive axis u and components of a driving torque at $^{\bar{u}}n_u$ are recorded as $f_u^c(\dot{r}_l^{\vec{I}})$ and $\tau_u^c(\dot{\phi}_l^{\vec{I}})$, respectively; a force and an acting torque of an environment i to the axis l being $^{is}f_{l_S}$ and $^i\tau_l$, respectively; a dynamics normative equation for an axis u being:

$$\begin{cases} {}^{i|\overline{u}}n_u^T \cdot M_P^{[u][\bullet]} \cdot \ddot{q} + {}^{i|\overline{u}}n_u^T \cdot h_P^{[u]} = f_u^D, & \text{if } {}^{u}k_u \in P \\ {}^{i|\overline{u}}n_u^T \cdot M_R^{[u][\bullet]} \cdot \ddot{q} + {}^{i|\overline{u}}n_u^T \cdot h_R^{[u]} = \tau_u^D, & \text{if } {}^{u}k_u \in R \end{cases};$$

wherein: $M_P^{[u][v]}$ and $M_R^{[u][v]}$ are a 3×3 block matrix, $h_P^{[u]}$ and $h_R^{[u]}$ are 3D vectors; and have:

$$\ddot{q} = \left\{ {}^{i|\overline{l}}\ddot{q}_l = {}^{i|\overline{l}}n_l \cdot \ddot{q}_l^{\bar{l}} \left| \begin{array}{l} \ddot{q}_l^{\bar{l}} = \ddot{r}_l^{\bar{l}}, \text{ if } {}^{l}k_l \in P; \\ \ddot{q}_l^{\bar{l}} = \ddot{\phi}_l^{\bar{l}}, \text{ if } {}^{l}k_l \in R; \end{array} \right. l \in A \right\},$$

$$M_P^{[u][\bullet]} \cdot \ddot{q} = \sum_l^{u_L} \left( \left\| \begin{array}{c} -\sum_j^{i|\overline{l}}(m_j \cdot {}^{i|l}\tilde{r}_{j_l}) \\ \sum_j^{u_L}(m_j) \cdot 1 \end{array} \right\| \cdot {}^{i|\overline{l}}n_l \cdot \ddot{q}_l^{\bar{l}} \right) + \sum_k^{u_L} \left( \left\| \begin{array}{c} -\sum_j^{k_L}(m_j \cdot {}^{i|k}\tilde{r}_{j_l}) \\ \sum_j^{k_L}(m_j) \cdot 1 \end{array} \right\| \cdot {}^{i|\overline{k}}n_k \cdot \ddot{q}_k^{\bar{k}} \right),$$

$$h_P^{[u]} = \sum_k^{u_L} \left( m_k \cdot \sum_l^{i_{k_l}} ({}^{i}\dot{\phi}_l^2 \cdot {}^{i|\overline{l}}r_l + 2 \cdot {}^{i}\dot{\phi}_l \cdot {}^{i|\overline{l}}\dot{r}_l) \right) + \sum_k^{u_L} (m_k \cdot {}^{i}g_{k_l}),$$

$$h_R^{[u]} = \sum_k^{u_L} \left( m_k \cdot {}^{i|u}\tilde{r}_{k_l} \cdot \sum_l^{i_{k_l}} ({}^{i}\dot{\phi}_l^2 \cdot {}^{i|\overline{l}}r_l + 2 \cdot {}^{i}\dot{\phi}_l \cdot {}^{i|\overline{l}}\dot{r}_l) \right) +$$

$$\sum_k^{u_L} ({}^{i}\dot{\phi}_k \cdot {}^{i|k}J_{k_l} \cdot {}^{i}\dot{\phi}_k) + \sum_k^{u_L} (m_k \cdot {}^{i|u}\tilde{r}_{k_l} \cdot {}^{i}g_{k_l}),$$

$$M_R^{[u][\bullet]} \cdot \ddot{q} = \sum_l^{i_{l_u}} \left( \left\| \begin{array}{c} \sum_j^{u_L}({}^{i|j}J_{j_l} - m_j \cdot {}^{i|u}\tilde{r}_{j_l} \cdot {}^{i|l}\tilde{r}_{j_l}) \\ \sum_j^{u_L}(m_j \cdot {}^{i|u}\tilde{r}_{j_l}) \end{array} \right\| \cdot {}^{i|\overline{l}}n_l \cdot \ddot{q}_l^{\bar{l}} \right) +$$

$$\sum_k^{u_L} \left( \left\| \begin{array}{c} \sum_j^{k_L}({}^{i|j}J_{j_l} - m_j \cdot {}^{i|u}\tilde{r}_{j_l} \cdot {}^{i|k}\tilde{r}_{j_l}) \\ \sum_j^{k_L}(m_j \cdot {}^{i|u}\tilde{r}_{j_l}) \end{array} \right\| \cdot {}^{i|\overline{k}}n_k \cdot \ddot{q}_k^{\bar{k}} \right),$$

$$\begin{cases} f_u^D = f_u^c + \dot{r}_u^{\overline{u}} \cdot G(f_u^c) + {}^{i|\overline{u}}n_u^T \cdot \sum_l^{u_L}({}^{i_s}f_{l_s}), & \text{if } {}^{u}k_u \in P \\ \tau_u^D = \tau_u^c + \dot{\phi}_u^{\overline{u}} \cdot G(\tau_u^c) + {}^{i|\overline{u}}n_u^T \cdot \sum_l^{u_L}({}^{i|u}\tilde{r}_{l_s} \cdot {}^{i_s}f_{l_s} + {}^{i}\tau_l), & \text{if } {}^{u}k_u \in R \end{cases};$$

wherein, $k_I$ indicates a link k's centroid I; a mass and a centroid torque of inertia of an axis k are recorded as $m_k$ and ${}^{k_I}J_{k_I}$, respectively; $M_R^{[u][\bullet]}$ is an inertia matrix of a rotational axis u; $M_P^{[u][\bullet]}$ is an inertia matrix of a translational axis u; $h_R$ is a non-inertia matrix of the rotational axis u; $h_P$ is a non-inertia matrix of the translational axis u; an external force and a torque acting on an axis u at ${}^{\overline{u}}n_u$ are recorded as $f_u^D$ and $\tau_u^D$, respectively; the bilateral driving force of the drive axis u and the components of the driving torque at ${}^{\overline{u}}n_u$ are recorded $f_u^c(\dot{r}_l^{\bar{l}})$ and $\tau_u^c(\dot{\phi}_l^{\bar{l}})$, respectively; the force and the acting torque of the environment i to the axis 1 are ${}^{i_s}f_{l_s}$ and ${}^{i}\tau_l$ respectively.

19. The modeling and solving method according to claim 18, wherein if the multi-axis rigid body system D={A, K,T,NT, F,B} contains only a rotational axis, NT=∅, the dynamic normative equation is simplified to:

$$M_R^{[u][\bullet]} \cdot \ddot{q} = \sum_l^{i_{l_u}} \left( \sum_k^{u_L} ({}^{i|k_l}J_{k_l} - m_k \cdot {}^{i|u}\tilde{r}_{k_l} \cdot {}^{i|l}\tilde{r}_{k_l}) \cdot {}^{i|\overline{l}}n_l \cdot \ddot{\phi}_l^{\bar{l}} \right) +$$

$$\sum_k^{u_L} \left( \sum_j^{k_L} ({}^{i|j_l}J_{j_l} - m_j \cdot {}^{i|u}\tilde{r}_{j_l} \cdot {}^{i|k}\tilde{r}_{j_l}) \cdot {}^{i|\overline{k}}n_k \cdot \ddot{\phi}_k^{\bar{k}} \right).$$

20. A modeling and solving method for controlling a multi-axis robot device, wherein a multi-axis robot device includes a link set and a joint set, and links in the link set are combined with the joints in the joint set; this modeling and solving method includes:

converting the joint set to a corresponding link set, where one joint in the joint set corresponds to a subaxes set of an axes set and an axis of the axis set is a translational axis or a rotational axis;

using the axes set to describe the multi-axis robot device correspondingly; establishing a kinetic equations by using the axes set, and solving an unknown quantity in this kinetic equation by substituting a known quantity to solve mechanical problems encountered in controlling this multi-axis robot device; the kinetic equation being as follows: given a multi-axis rigid body system D={A, F, B}, an inertial system is denoted by $F_{[i]}$, $\forall u,u',l \in A$, ${}^{u}s_{k_{u's}} \in NT$;

in addition to gravity, an external force acting on an axis 1 and a torque on the ${}^{\overline{u}}n_u$ are recorded as $f_u^D$ and $\tau_u^D$, respectively; a mass and a centroid torque of inertia of the axis 1 are denoted as $m_k$ and ${}^{k_I}J_{k_I}$, respectively; a gravity acceleration of the axis 1 being ${}^{i}g_{l_I}$; a bilateral driving force of a drive axis u and components of a driving torque at ${}^{\overline{u}}n_u$ are recorded as ${}_u^c(\dot{r}_l^{\bar{l}})$ and $\tau_u^c(\dot{\phi}_l^{\bar{l}})$, respectively; a force and an acting torque of an environment i to the axis 1 being ${}^{i_s}f_{l_s}$ and ${}^{i}\tau_l$, respectively; a generalized constraint of an axis u versus an axis u' is denoted ${}^{u|u_S}l_{u'_S}$, and:

a Ju-Kane dynamics normative equation for the axis u and the axis u' being:

$$\begin{cases} {}^{i|\overline{u}}n_u^T \cdot M_P^{[u][\bullet]} \cdot \ddot{q} + {}^{i|\overline{u}}n_u^T \cdot h_P^{[u]} + {}^{i|\overline{u}}n_u^T \cdot {}^{i|NT}l_u = f_u^D, & \text{if } {}^{u}k_u \in P \\ {}^{i|\overline{u}}n_u^T \cdot M_R^{[u][\bullet]} \cdot \ddot{q} + {}^{i|\overline{u}}n_u^T \cdot h_R^{[u]} + {}^{i|\overline{u}}n_u^T \cdot {}^{i|NT}l_u = \tau_u^D, & \text{if } {}^{u}k_u \in R \end{cases},$$

$$\begin{cases} {}^{i|\overline{u'}}n_{u'}^T \cdot M_P^{[u'][\bullet]} \cdot \ddot{q} + {}^{i|\overline{u'}}n_{u'}^T \cdot h_P^{[u']} + {}^{i|\overline{u'}}n_{u'}^T \cdot {}^{i|NT}l_{u'} = f_{u'}^D, & \text{if } {}^{u'}k_{u'} \in P \\ {}^{i|\overline{u'}}n_{u'}^T \cdot M_R^{[u'][\bullet]} \cdot \ddot{q} + {}^{i|\overline{u'}}n_{u'}^T \cdot h_P^{[u']} + {}^{i|\overline{u'}}n_{u'}^T \cdot {}^{i|NT}l_{u'} = \tau_{u'}^D, & \text{if } {}^{u'}k_{u'} \in R \end{cases},$$

respectively;

a constrained algebraic equation of a non-tree constraint pair ${}^{u}k_{u'}$ being:

$$\begin{aligned}
&{}^{i|u}J_{u_S} \cdot {}^{i|u}n_u \cdot \ddot{\phi}_u^{\bar{u}} + {}^{i|u'}J_{u'_S} \cdot {}^{i|u'}n_{u'} \cdot \ddot{\phi}_{u'}^{\bar{u}'} = 0, \text{ if } {}^{u}k_u \in R, {}^{u'}k_{u'} \in R,\\
&{}^{i|u}J_{u_S} \cdot {}^{i|u}n_u \cdot \ddot{r}_u^{\bar{u}} + {}^{i|u'}J_{u'_S} \cdot {}^{i|u'}n_{u'} \cdot \ddot{r}_{u'}^{\bar{u}'} = 0, \text{ if } {}^{u}k_u \in P, {}^{u'}k_{u'} \in P,\\
&{}^{i|u}J_{u_S} \cdot {}^{i|u}n_u \cdot \ddot{\phi}_u^{\bar{u}} + {}^{i|u'}J_{u'_S} \cdot {}^{i|u'}n_{u'} \cdot \ddot{r}_{u'}^{\bar{u}'} = 0, \text{ if } {}^{u}k_u \in R, {}^{u'}k_{u'} \in P,\\
&{}^{i|u}J_{u_S} \cdot {}^{i|u}n_u \cdot \ddot{r}_u^{\bar{u}} + {}^{i|u'}J_{u'_S} \cdot {}^{i|u'}n_{u'} \cdot \ddot{\phi}_{u'}^{\bar{u}'} = 0, \text{ if } {}^{u}k_u \in P, {}^{u'}k_{u'} \in R;
\end{aligned}$$

wherein:

$$\begin{aligned}
&{}^{i|NT}l_u = \sum_{u}^{NT}\left({}^{i|u}J_{u_S}^T \cdot {}^{i|u}n_{u'} \cdot \dot{t}_{u_S}^{u'_S}\right), {}^{i|NT}l_{u'} = \sum_{u'}^{NT}\left({}^{i|u'}J_{u'_S}^T \cdot {}^{i|u'}n_u \cdot \dot{t}_s^{u_S}\right),\\
&{}^{i|u}J_{u_S} = {}^{i|u}\tilde{r}_{u_S}, {}^{i|u'}J_{u'_S} = -{}^{i|u'}\tilde{r}_{u'_S}, \text{ if } {}^{u}k_u \in R, {}^{u'}k_{u'} \in R,\\
&{}^{i|u}J_{u_S} = -1, {}^{i|u'}J_{u'_S} = 1, \text{ if } {}^{u}k_u \in P, {}^{u'}k_{u'} \in P,\\
&{}^{i|u}J_{u_S} = {}^{i|u}\tilde{r}_{u_S}, {}^{i|u'}J_{u'_S} = 1, \text{ if } {}^{u}k_u \in R, {}^{u'}k_{u'} \in P,\\
&{}^{i|u}J_{u_S} = -1, {}^{i|u'}J_{u'_S} = -{}^{i|u'}\tilde{r}_{u'_S}, \text{ if } {}^{u}k_u \in P, {}^{u'}k_{u'} \in R;
\end{aligned}$$

wherein $M_P^{[u][v]}$ and $M_R^{[u][v]}$ are a 3×3 block matrix, $h_P^{[u]}$ and $h_R^{[u]}$ are 3D vectors; $k_I$ indicates a link k's centroid I; a mass and a centroid torque of inertia of an axis k are recorded as $m_k$ and ${}^{k_I}J_{k_I}$, respectively; $M_R^{[u][\bullet]}$ is an inertia matrix of a rotational axis u; $M_R^{[u][\bullet]}$ is an inertia matrix of a translational axis u; $h_R$ is a non-inertia matrix of the rotational axis u; $h_P$ is a non-inertia matrix of the translational axis u; $\dot{r}_u^{\bar{u}}$ is a translational joint angular velocity; and $\dot{\phi}_u^{\bar{u}}$ is a rotational joint angular velocity.

21. The modeling and solving method according to claim 20, wherein the Ju-Kane dynamic normative equation is a closed-chain rigid body system.

22. A modeling and solving method for controlling a multi-axis robot device, wherein a multi-axis robot device includes a link set and a joint set, and links in the link set are combined with joints in the joint set; this modeling and solving method includes:

converting the joint set to a corresponding link set, where one joint in a joint set corresponds to a subaxes set of an axes set and an axis of the axis set is a translational axis or a rotational axis;

using the axes set to describe the multi-axis robot device correspondingly; establishing a kinetic equations by using the axes set, and solving an unknown quantity in this kinetic equation by substituting a known quantity to solve the mechanical problems encountered in controlling this multi-axis robot device; the kinetic equation being as follows: given a multi-axis rigid body system D={A, K,T,NT,F,}, an inertial system is denoted as $F^{[i]}$, $\forall u,u',l \in A$, ${}^{u_S}k_{u'_S} \in NT$; $\bar{c}=i$; an axis sequence is recorded as ${}^{i}A_c=(i,c1,c2,c3,c4,c5,c]$, a parent axis sequence recorded as ${}^{i}\bar{A}_c=(i,i,c1,c2,c3,c4,c5]$, an axis type sequence recorded as ${}^{i}K_c=(X,R,R,R,P,P,P]$, a kinematic chain is recorded as ${}^{i}I_c=(i,c1, c2,c3,c4,c5, c]$; denoting $\phi_{(i,c]}=[\phi_{c1}{}^{i}, \phi_{c2}{}^{c1}, \phi_{c3}{}^{c2}]$, $\eta_{(i,c]}=[r_{c4}{}^{c3}, r_{c5}{}^{c4}, r_c{}^{c5}]$; in addition to gravity, an external force acting on an axis l and a torque on the ${}^{u}n_u$ are recorded as ${}^{i|D}f_u$ and ${}^{i|D}\tau_u$, respectively; a mass and a centroid torque of inertia of the axis l are denoted as $m_k$ and ${}^{k_I}J_{k_I}$, respectively; a gravity acceleration of the axis l is ${}^{i}g_l$; a bilateral driving force of a drive axis u and components of a driving torque at ${}^{u}n_u$ are recorded as $f_u{}^c(\dot{r}_l^l)$ and $\tau_u{}^c(\dot{\phi}_l^l)$, respectively; a force and an acting torque of an environment i to the axis l are ${}^{is}f_{l_S}$ and ${}^{i}\tau_l$, respectively; and having:

$$\begin{aligned}
&{}^{c|i}n_{c1} = 1^{[m]}, {}^{c|c1}n_{c2} = 1^{[n]}, {}^{c|c2}n_{c3} = 1^{[p]}\\
&m, n, p \in \{x, y, z\}, m \neq n, n \neq p,\\
&{}^{c|c5}n_c = 1^{[x]}, {}^{c|c4}n_{c5} = 1^{[y]}, {}^{c|c3}n_{c4} = 1^{[z]}\\
&{}^{c|c2}_0 r_{c3} = {}^{c|c3}_0 r_{c4} = {}^{c|c4}_0 r_{c5} = {}^{c|c5}_0 r_c = 0_3;
\end{aligned}$$

$$\begin{cases} M_P^{[c][\bullet]} \cdot \ddot{q} + h_P^{[c]} = {}^cQ_i \cdot {}^{i|D}f_c \\ M_R^{[c][\bullet]} \cdot \ddot{q} + h_R^{[c]} = {}^c\Theta_i \cdot {}^{i|D}\tau_c \end{cases};$$

wherein: ${}^cL$, indicates an opening tree of c, ${}^cL-c={}^{\underline{c}}L$, and have:

$${}^i\Theta_c = \partial^i\phi_c / \partial^i\phi_{(i,c]},$$

$$\ddot{q} = \left\{ {}^{i|l}\ddot{q}_l = {}^{i|l}n_l \cdot \ddot{q}_l^{\bar{l}} \middle| \begin{array}{l} \ddot{q}_l^{\bar{l}} = \ddot{r}_l^{\bar{l}}, \text{ if } {}^{l}k_l \in P; \\ \ddot{q}_l^{\bar{l}} = \ddot{\phi}_l^{\bar{l}}, \text{ if } {}^{l}k_l \in R; \end{array} l \in A \right\},$$

$$M_P^{[c][\bullet]} \cdot \ddot{q} = m_c \cdot {}^iQ_c \cdot \ddot{r}_{(i,c]}^T - m_c \cdot {}^{i|c}\tilde{r}_{k_I} \cdot {}^i\Theta_c \cdot \ddot{\phi}_{(i,c]}^T + {}^cQ_i \cdot \sum_{k}^{{}^{\underline{c}}L}\left( \begin{array}{c} \sum_{j}^{k_L}(m_j) \\ -\sum_{j}^{k_L}(m_j \cdot {}^{i|k}\tilde{r}_{j_I}) \end{array} \right) \Bigg\| \cdot {}^{i|l}n_l \cdot \ddot{q}_k^{\bar{k}},$$

$$M_R^{[c][\bullet]} \cdot \ddot{q} = \left({}^{i|c}I_{c_I} - m_c \cdot {}^{i|c}\tilde{r}_{c_I}^2\right) \cdot {}^i\Theta_c \cdot \ddot{\phi}_{(i,c]}^T + m_c \cdot {}^{i|c}\tilde{r}_{c_I} \cdot {}^iQ_c \cdot \ddot{r}_{(i,c]}^T + {}^c\Theta_i \cdot \sum_{k}^{{}^{\underline{c}}L}\left( \begin{array}{c} \sum_{j}^{k_L}(m_j \cdot {}^{i|c}\tilde{r}_{j_I}) \\ \sum_{j}^{k_L}({}^{i|j}I_{j_I} - m_j \cdot {}^{i|c}\tilde{r}_{j_I} \cdot {}^{i|k}\tilde{r}_{j_I}) \end{array} \right) \Bigg\| \cdot {}^{i|k}n_k \cdot \ddot{q}_k^{\bar{k}};$$

wherein $M_P^{[c][v]}$ in the formula, and $M_R^{[c][v]}$ are a 3×3 block matrix, $h_P^{[c]}$ and $h_R^{[c]}$ are 3D vectors; $k_I$ indicates a link k's centroid I; a mass and a centroid torque of inertia of the axis k are recorded as $m_k$ and ${}^{k_I}J_{k_I}$, respectively; $M_R^{[c][\bullet]}$ is an inertia matrix of a rotational axis u; $M_P^{[c][\bullet]}$ is an inertia matrix of a translational axis u; $h_R$ is a non-inertia matrix of the rotational axis u; $h_P$ is a non-inertia matrix of the translational axis; and u; $\ddot{q}_k^{\bar{k}}$ is a joint angular velocity.

* * * * *